March 1, 1966     S. NORWALK ETAL     3,238,087
METHOD OF MAKING LAMINATED STRUCTURAL ELEMENTS
AND ARTICLE PRODUCED THEREBY
Filed Dec. 19, 1962
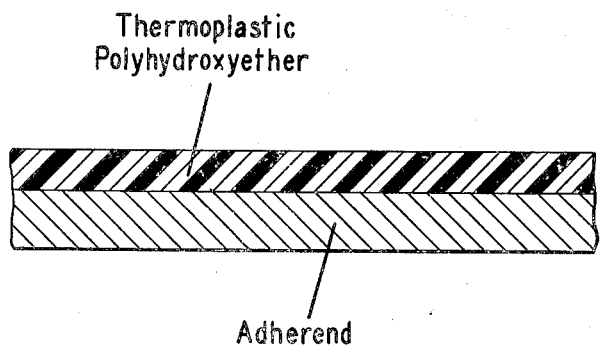
INVENTORS
STANLEY NORWALK
THOMAS E. BUGEL
ROBERT H. SNEDEKER
BY *Louis J. Bachand Jr.*
ATTORNEY

United States Patent Office 3,238,087
Patented Mar. 1, 1966

3,238,087
METHOD OF MAKING LAMINATED STRUCTURAL ELEMENTS AND ARTICLE PRODUCED THEREBY
Stanley Norwalk, Basking Ridge, Thomas E. Bugel, Metuchen, and Robert H. Snedeker, New Brunswick, N.J., assignors to Union Carbide Corporation, a corporation of New York
Filed Dec. 19, 1962, Ser. No. 245,647
10 Claims. (Cl. 161—185)

This invention relates to virtually universally adherent thermoplastic materials and structural elements utilizing such materials in one or more of decorative, protective, structural or bonding capacities. More particularly, the invention relates to virtually universally adherent materials combining the characteristically excellent bonding properties of thermosetting materials and the characteristic application versatility of thermoplastic materials. The invention further relates to structural elements comprising an adherend and these adherent materials and method of making the same.

This application is a continuation-in-part of our copending application Ser. No. 171,289, filed Feb. 5, 1962 now abandoned.

Means of modifying known materials to adapt them to new uses and new environments are the subject of an unending search. Very often the means discovered is the combination of two or more materials in a manner enabling the obtaining from each material the maximum effect of desirable properties and the minimum effect of the undesirable properties. For example, if a material is inexpensive and strong but has an unattractive surface, it is provided with a decorative coating e.g. a veneer of more beautiful and costlier material; if a material of adequate strength is prone to deterioration upon exposure to its usual use environment, it is provided with a protective coating; if a material lacks sufficient strength for some structural (load-bearing) use it is bonded to one or more other materials until the desired strength is obtained in the plural ply structural element; and if the material lacks adhesiveness to that substrate, it is coated at least in part with a material which adheres to it and the substrate.

The above methods for maximum utilization of properties of know materials each involve the obtaining of an adequate strength adhesive bond at the surface of the material. One widely used method of obtaining such bonds is through the use of thermosetting resins. These resins, notably phenolic resins and epoxy resins, find their chief advantage in their capacity to develop bonds of great strength with numerous substrates and thus facilitate the obtaining of each of the above beneficial modifications. Another advantage of thermosetting resins is their characteristic resistance to creep under long term stress. This is significant where the bond is to be used to bear structural loads for an indefinite period.

Thermosetting resins have been employed heretofore where high bond strength and good creep resistance were prime considerations, despite their costliness and the inconvenience of handling them, because there simply was not available any more easily handled material capable of equaling thermosetting resins in these properties. Thermoplastic resin, for example, which form adhesive films e.g. polyvinyl acetate have found little, if any, utility in application where great bond strength and low creep is required because they have heretofore been unable to deliver both these properties.

The potential advantages of an adherent thermoplastic material over commonly used thermosetting materials include both process and product improvements. Process improvement would be obtained because by their nature thermoplastic resins are quite easily and conveniently shaped and applied, and unlike thermosetting resins, the thermoplastic resins have a practically unlimited shelf life, are usable without mixing of components, require no cure and hence obviate costly cure cycles, and contain no volatiles to mar the finished bond. The ultimate convenience in adhesive materials is, of course, a self-sustaining film and thermoplastics are readily film-forming. Product improvement would be obtained because by their nature thermoplastic resins are less brittle, more flexible and more easily variously colored than many known thermosetting resins and can be repeatedly softened for further processing or rectifying of assembling errors.

It is, therefore, an object of the present invention to provide a virtually universally adherent thermoplastic material combining the best attributes of both thermosetting resins and thermoplastic resins.

It is another object to provide a virtually universally adherent thermoplastic material having bonding strengths and creep resistance equal to thermosetting resins.

It is another object to provide structural elements wherein this virtually universally adherent thermoplastic material is employed in one or more decorative, protective, structural or bonding capacities.

Other objects will appear hereinafter.

It has now been discovered that thermoplastic polyhydroxyethers exhibit the bonding strength, creep resistance and the virtually universal adherence of thermosetting resins, and that structural elements comprising thermoplastic polyhydroxyethers bonded to an adherend far exceed in their bond strength and creep resistance heretofore known structural elements comprising adherends and other thermoplastic resins. And that thermoplastic polyhydroxyether bonds in fact, approximate and can even exceed in strength and creep resistance, bonds of thermosetting resins.

Thermoplastic polyhydroxyethers can be applied to adherends from solution as by spraying, dipping, brush flow coating, impregnation and the like; by melt application as in extrusion coating, powder coating, flame spraying and fluid bed coating and the like; and, importantly, by film laminating.

A highly surprising aspect of the present invention is the superior bonding effects achieved by bonding at very high temperatures, temperatures greatly in excess of what is considered the heat degradation temperature of the thermoplastic polyhydroxyether.

It is a significant advantage of thermoplastic polyhydroxyethers as an adhesive bonding material that it is available in the form of a flat sheet or as film on a roll. Some of the advantages gained by use of thermoplastic polyhydroxyether film as an adhesive material include:

(1) Single component system, no mixing to form the adhesive.
(2) Unlimited shelf life.
(3) No liquids to be handled.
(4) No volatiles.
(5) No priming of the adherend necessary.
(6) No prolonged curing cycles.
(7) Bonds of great strength obtained.
(8) Readily controllable glue line thickness.
(9) Absolute freedom from pinholes.
(10) Ultra thin laminates feasible.
(11) Lower cost because less material required.
(12) No necessity of supporting web for film adhesive.
(13) Thermoplastic films readily produced by a variety of inexpensive means.
(14) Reproducible bonding effects; no vagaries due to cure cycles and storage.

There has not been known prior to the present invention a thermoplastic material possessing the above attributes, in fact, there has not been known heretofore a widely adhesive thermoplastic film.

Thermoplastic polyhydroxyethers lend themselves to coating virtually any surface having any contour. Moreover, a coating of polyhydroxyether is itself a base material to which other materials can be bonded, using the thermoplastic polyhydroxyether as the adhesive.

Although thermosetting adhesive films are known, their properties and advantages do not begin to compare with those of thermoplastic polyhydroxyether adhesive film. Whereas a thermosetting film requires a chemical reaction to bond, the thermoplastic polyhydroxyethers taught herein require only as much temperature and pressure as is necessary to make the polyhydroxyether flow into intimate contact with the adherend. This can be a matter of a few seconds or only a brief fraction of a second. A summary of advantages of thermoplastic polyhydroxyether film, over a typical thermosetting resin film, phenolic nitrile, is presented in Table I below.

TABLE I

*Comparison of storage, handling and application conditions for bonding films*

| Class | Thermosetting | Thermoplastic |
| --- | --- | --- |
| Type of Resin | Phenolic nitrile | Polyhydroxyether. |
| Form | Unsupported film, polyethylene liner. | Unsupported film, no liner. |
| Volatile content | Film exposed for 1 hr. at 350° F., >5% wt. loss. | 0. |
| Cure temperature | Min. 257° F.; 60 minutes at 350° F. and 150 p.s.i. recommended. | 300° F. to 800° F. depending on substrate. Bonds within seconds or less at low pressures. |
| Maximum storage | 6 months at >40° F | Indefinite. |

Thermoplastic polyhydroxyether is, as illustrated in Table I, in essentially its final chemical form and need only be caused to flow for a moment in order to be activated into bonding to an adherend. Activation is by heating either the substrate and pressing the thermoplastic polyhydroxyether thereagainst or heating the thermoplastic polyhydroxyether in some manner, e.g. radiant heating, convection, induction, electrically, ultrasonically, et cetera, and pressing the adherend against the resin or a heated particulate adherend can be blown against the thermoplastic polyhydroxyether.

The superiority of thermoplastic polyhydroxyether over other thermoplastics in terms of bond strength is shown in Table II following. In each lamination the metal bars of aluminum alloy 2024T3 cleaned as described in Example 22 were overlapped with approximately 8 mils of the indicated thermoplastic between the bars. Aluminum plates protected by aluminum foil were placed on either side of the lap joint assembly and the composite was placed in a press for the indicated dwell time at the indicated temperature, then removed to a press at 380° F. and then cooled to room temperature.

TABLE II

| Thermoplastic | Press Temperature, °F. | Dwell Time, Seconds | Average lap shear strength [1] (p.s.i.) |
| --- | --- | --- | --- |
| Polyhydroxyether | 700 | 40 | 2,850 |
| Polystyrene | 700 | 40 | 600 |
| Vinyl chloride/vinyl acetate copolymer | 500 | 40 | 570 |
| Polyethylene | 700 | 40 | 770 |
| Polyester | 700 | 40 | 780 |
| Vinyl chloride/vinyl acetate/maleic acid copolymer | 600 | 20 | 1,060 |

[1] ASTM D1002.

The utility and uniqueness of thermoplastic polyhydroxyethers as an adhesive is partly due to the fact that the polyhydroxyethers are useful plastics in their own right. For example, a structural element like a stair tread for a ladder if molded of polyethylene must be fastened to the ladder with some sort of mechanical fastener or separate adhesive. If the stair tread is fabricated of thermoplastic polyhydroxyether, the legs of the ladder can be heated and the polyhydroxyether stair tread pressed thereagainst. The structural element is thus assembled without fasteners or separate adhesive. Then, abrasive grains can be imbedded in the upper surface of the stair tread to give a non-skid step, simply by pressing heated emery or other abrasive grain into the tread surface. If the tread were made of polyethylene, another adhesive would be required at the tread surface. In this illustration thermoplastic polyhydroxyether is being used as an adhesive, but advantage is taken also of its properties of easy moldability, great toughness and rigidity and moisture resistance.

In general, it can be stated that what is required to adhere thermoplastic polyhydroxyethers to an adherend is to flux the polyhydroxyether at the interface of the two materials. Fluxing is flow under heat and usually pressure, and is most easily accomplished by the input of sufficient heat into the area to be bonded. It is to be emphasized that actual flow is not necessary, because the polyhydroxyether can be "activated" into bonding without flow, as occurs, for example, in some solution coatings. Generally, a short bake at moderate temperatures will improve the bond obtained from solution coatings. The use of pressure assists in obtaining good bonding. Typical of amorphous thermoplastics, polyhydroxyethers have no distinct melting point or narrow melting range but rather soften over a wide temperature range. At the lower end of the softening range, heat alone may not be sufficient to flux the resin as it is at the high end of the range, but a combination of mild heat and pressure will cause the polyhydroxyethers to flow.

It is preferred in this invention to fabricate the structural elements comprising the thermoplastic polyhydroxyether and the adherend at the highest temperature consistent with maintaining the integrity of the polyhydroxyether and the substrate. It is particularly preferred to bond at temperatures above the degradation temperature of the polyhydroxyether, e.g. 600° F. and above, especially 700° F. and above but in cycles which allow so brief an exposure that the resin is only fluxed and not degraded.

The terms "structural element" and "structural elements" as used herein refer to an assembly or assemblies of one or more discrete, planar, curvilinear, rectangular, round or odd shaped objects and a thermoplastic polyhydroxyether. The assembly is characterized by an adhesive bond between a thermoplastic polyhydroxyether and the object or objects. The terms comprehend, therefore, structural elements comprising an adherend, such as a substrate and an adhering layer of thermoplastic polyhydroxyethers as in a two-ply laminate or a coated substrate; structural elements comprising an interlayer of thermoplastic polyhydroxyether sandwiched between and adhered to two similar or dissimilar adherends or laminae as in a plural ply laminate; structural elements comprising a thermoplastic polyhydroxyether matrix surrounding and adhered to as a bond and/or a support for variously shaped and sized adherends such as articles of varying porosities, e.g. as the bonding agent and/or substrate in "sandpaper" and fiber-reinforced plastic articles; structural elements comprising structural members bonded together either closely adjacent or spaced apart by thermoplastic polyhydroxyether elements; and combinations of the foregoing. The adherend preferably is readily wettable by the thermoplastic polyhydroxyether either because of a polar nature such as characterizes metals, glass and wood and is absent in polyethylene or because of surface treatment or cleanliness or for any other reason.

As indicated above the present invention relates to structural elements comprising thermoplastic polyhydroxyethers, which we have discovered to have surprising adhesive properties, and a variety of adherends, i.e. materials having tangible surfaces to which thermoplastic polyhydroxyether can adhere. Because of the diversity of adherends, adhering techniques, and end product elements contemplated in the present invention further description of the invention is accompanied by actual examples of adherends, adhering techniques and end product structural elements.

In the following examples all proportions, parts and percentages are by weight unless otherwise stated.

Melt flow of each of the thermoplastic polyhydroxyethers was determined by weighing in grams the amount of polyhydroxyether, which was at a temperature of 220° C. and under a pressure of 44 p.s.i., that flowed through an orifice having a diameter of 0.825 inch and a length of 0.315 inch over a 10 minute period. Four such determinations were made and the average of the four determinations was reported as decigrams per minute under a pressure of 44 p.s.i. and at 220° C.

An important use of thermoplastic polyhydroxyether is in structural elements comprising at least one metal adherend and a thermoplastic polyhydroxyether.

EXAMPLE 1

The particular thermoplastic polyhydroxyether used in this example was prepared by the condensation reaction of equimolar amounts of 2,2-bis(4-hydroxyphenyl)propane and epichlorohydrin together with sodium hydroxide.

The equipment used was a two liter three-necked flask provided with a sealed stirrer, thermometer and reflux condenser. There was placed in the flask:

| | | |
|---|---|---|
| 2,2-bis(4-hydroxyphenyl)propane | grams | 114.15 |
| | (0.5 mole) | |
| Epichlorohydrin (99.1% pure) | do | 46.8 |
| | (0.5 mole) | |
| Ethanol | do | 96.0 |
| Butanol | do | 10.0 |
| Sodium hydroxide (97.5% pure) | do | 22.6 |
| Water | do | 70.0 |

The above mixture was stirred at room temperature for sixteen hours to accomplish the initial coupling reaction. The mixture was then heated at 80° C. for an hour. Thereupon, sixty milliliters of a 7:3 mixture of toluene:butanol was added to the flask. Heating of the mixture at 80° C. was continued another two hours. There was added to the flask, an additional fifty milliliters of the 7:3 toluene:butanol mixture and 4.5 grams of phenol. The contents of the flask were continued heated at 80° C. (reflux) for two and one-half hours and then allowed to cool. Total reaction time at 80° C. was five and one-half hours. Upon cooling, the reaction mixture was cut with two hundred milliliters of the 7:3 toluene:butanol mixture. One hundred milliliters of water was added to the flask and agitated with the contents to dissolve salts present in the reaction mixture. The flask contents were allowed to settle for ten minutes, during which time a lower brine phase formed. This lower phase was separated by decantation. The upper polymer solution containing phase was washed successively with two one-hundred-sixty milliliter portions of water containing 4.5 percent butanol. The washed polymer solution was acidified by stirring the solution with a mixture of one milliliter of 85 percent phosphoric acid with one hundred milliliters of water (pH=2) for one hour. The upper polymer solution phase was again separated by decantation and water washed with four successive two hundred milliliter portions of water containing 4.5 percent butanol. The washed polymer was then coagulated in one liter of isopropanol, filtered and dried. There was obtained a polyhydroxyether of 2,2-bis(4-hydroxyphenyl)propane and epichlorohydrin having a melt flow of 1.0 decigram/minute.

This thermoplastic polyhydroxyether was extruded into one mil film. Two plies of the one mil film were placed between two one-inch wide strips of 0.064 inch thick aluminum sheet which had been cleaned with household cleanser and detergent and rinsed and then cleaned with an acid cleaner comprising a mixture of 35 cc. of saturated sodium dichromate and 1000 cc. of concentrated sulfuric acid. The aluminum strips were overlapped one-half inch giving a one-half inch square assembly of aluminum-thermoplastic polyhydroxyether-aluminum.

After being encased between metal plates protected with aluminum foil the assembly was placed between two molding platens heated to 730–740° F. The platens were closed at nominal pressure over the assembly for a time sufficient to flux the thermoplastic polyhydroxyether. In less than 10 seconds the resin flowed. The platens were immediately opened and the assembly transferred to a second press the platens of which were heated to only 390–400° F. The platens were closed on the assembly and cooling water was applied to the platens. Within 5 minutes the aluminum-2-mil polyhydroxyether aluminum laminate construction was cool enough to touch with the hand and was removed.

The bond strength was measured as lap shear strength according to ASTM D1002. The shear strength value of the bond of the structural element exceeded 1600 p.s.i.

EXAMPLE 2

A laminate construction was made as in Example 1 but using 8 layers of the one mil film. Lap shear strength of the structural element was 2600 p.s.i.

Thicker sections of polyhydroxyether can be built up from many plies or a film of the desired thickness can be employed as illustrated in

EXAMPLE 3

A laminate construction was made as in Example 1 but using one layer of two mil film. Again lap shear strength of the structural element bond exceeded 1600 p.s.i.

Melt flow of the thermoplastic polyhydroxyether can be varied over a wide range as shown in the following two examples:

EXAMPLE 4

Thermoplastic polyhydroxyether of 2,2-bis(4-hydroxyphenyl)-propane and epichlorohydrin prepared as in Example 1 but having a melt flow of 15 was laminated as eight one mil plies to aluminum sheet in the manner of Example 2. Lap shear strength of the structural element bond was 2600 p.s.i.

EXAMPLE 5

Thermoplastic polyhydroxyether of 2,2-bis(4-hydroxyphenyl)-propane and epichlorohydrin prepared as in Example 1, but having a melt flow of 30, was laminated as eight one mil plies to aluminum sheet as in Example 1. Lap shear strength of the structural element bond was 2200 p.s.i.

Example 6 illustrates the preparation of a structural element wherein the polyhydroxyether contributes mechanical strength as well as bonding properties.

EXAMPLE 6

A thick section of thermoplastic polyhydroxyether was sandwiched between two sheets of aluminum foil. Using a thermoplastic polyhydroxyether prepared from 2,2-bis(4-hydroxyphenyl)-propane and epichlorohydrin as in Example 1 but having a melt flow of 1.2 a laminate construction was prepared by placing a section of thermoplastic polyhydroxyether 0.125 inch thick between two sheets of aluminum each 0.002 inch thick (surface cleaned as in Example 1) and placing the assembly in a press at 375° F. for one minute at 100 p.s.i. and another minute at 300 p.s.i. and cooling. The laminated structural element was pressed in stops to a thickness of 0.032 inch. The laminated structural element obtained was well bonded together and highly ductile so that there was little or no spring or recovery on bending the structural element.

This laminated structural element was found to be cold drawable into numerous contours in the same way steel and aluminum are cold drawable in metal forming presses and at rates and in dies designed for metal drawing. Surprisingly, no delamination occurs in the cold forming. The contours had the appearance and feel of being wholly aluminum metal except for reduced weight.

Laminating temperatures for polyhydroxyether film and aluminum structural elements as well as laminating times and pressures can be varied. Of these three factors, temperature has the most effect as shown in

EXAMPLE 7

Using one mil film of a thermoplastic polyhydroxyether prepared from 2,2-bis(4-hydroxyphenyl)propane and epichlorohydrin as in Example 1 there were prepared a series of laminates by pressing two one-inch wide strips of aluminum sheeting together on the polyhydroxyether at temperatures ranging from 150 to 200° C., at pressures ranging from nominal to 200 p.s.i. and for times ranging from 5 to 30 minutes. Lap shear strengths obtained ranged from 560 to 1310 p.s.i. with the higher bonding temperatures providing the higher strengths at all pressures and laminating times.

In order to indicate the degree of the advantage in bonding strengths offered by thermoplastic polyhydroxyether over thermosetting adhesives there follows comparative data between a thermoplastic polyhydroxyether of 2,2-bis(4-hydroxyphenyl)-propane and epichlorohydrin adhesive having a melt flow of 1.0 and a widely recommended thermosetting metal-to-metal adhesive comprising 100 parts of a technical grade epoxy resin comprising the diglycidyl ether of 2,2-bis(4-hydroxyphenyl)-propane and 67 parts of a polyaminoamide epoxy hardener (Versamide 115, a reaction product of polyamines and 9,12-linoleic acid dimer).

EXAMPLES 8–11

In the following series of tests identical pairs of aluminum strips were bonded together:

(1) With the above-mentioned thermoplastic polyhydroxyether: Film thickness was 8 mils, platen temperature was 700° F. and exposure to heat was for 20 seconds. The aluminum strips were precleaned with phosphoric acid.

(2) With the above-mentioned epoxy-Versamide thermosetting adhesive: The mixture was applied and set by standing at 25° C. for 12 hours and then post-curing for 90 minutes at 200° C. continuously under a pressure of 100 grams/square inch. The aluminum strips were precleaned with chromic acid ($H_2SO_4 + Na_2Cr_2O_7$) at 160° F. for 10 minutes.

Testing was at various temperatures and after various aging times. Results (average of 5) of ASTM D1002 tensile lap shear strength tests are summarized in Table III.

TABLE III

*Average lap shear strength (p.s.i.)*

| Ex. | Test temperature, °F. | Sample condition | Thermoplastic polyhydroxyether | Thermosetting Epoxy/Versamid 115 |
|---|---|---|---|---|
| 8 | −67 | No aging | 3,150 | |
| 9A | 73 | ...do... | 3,540 | 2,540 |
| 10 | 180 | ...do... | 2,820 | 160 |
| 11 | 220 | ...do... | 1,420 | 110 |
| 9B | 73 | Aged 30 days at 180° F. | 2,830 | 2,490 |

The thermoplastic polyhydroxyether was greatly superior to the widely used thermosetting adhesive at room temperature and was outstanding in its retention of strength at high and low temperatures. Surprisingly, even after prolonged aging at an elevated temperature the thermoplastic was superior in shear strength to the thermosetting systems.

A further advantage of metal-to-metal bonds obtained with thermoplastic polyhydroxyether is the retention of high shear strength despite prolonged exposure to chemically active environments. This is illustrated in

EXAMPLES 12–21

A number of laminates were prepared by bonding aluminum strips to one another with 8 one-mil plies of a film of the polyhydroxyether of Example 1. Bonding was to phosphoric acid cleaned aluminum at 700° F. for 20 seconds. Effects on the bonds of exposure to various environments are given in Table IV.

TABLE IV

*Polyhydroxyether bond resistance to various environments*

| Example | Environment | Average lap shear strength (p.s.i.) |
|---|---|---|
| Control | Air | 4,090 |
| 12 | Salt water spray—30 days | 2,470 |
| 13 | Tap water immersion—30 days | 2,570 |
| 14 | 50% relative humidity and 73° F.—30 days | 3,900 |
| 15 | Autoclave—20 minutes at 250° F. | 2,280 |
| 16 | Boiling water—2 hours | 2,285 |
| 17 | Chromic acid at 160° F.—10 minutes | 2,180 |
| 18 | Autoclave—2 hours at 250° F. | 2,730 |
| 19 | Aircraft oil (Skydrol 500A)—7 days | 1,580 |
| 20 | Ethylene glycol—7 days | 2,030 |
| 21 | Isopropanol—7 days | 2,140 |

As stated above, prime advantages of polyhydroxyethers are their surprisingly great adhesiveness and creep resistance, in which properties thermoplastic polyhydroxyethers often meet and surpass thermosetting materials. This is clearly shown in a property such as creep resistance where heretofore the physical nature of even high bond strength thermoplastics such as polyvinyl acetate has been thought to preclude good creep resistance. The phenomenal creep resistance of thermoplastic polyhydroxyether is indicated below in a stress relaxation test. Stress relaxation is a creep phenomenon.

EXAMPLE 22

Two strips of aluminum (0.064 inch thick) which has been cleaned by being wiped with methyl ethyl ketone, immersed successively for 10 minutes in 85% phosphoric acid, n-butyl alcohol, and tap water and rinsed with tap water was bonded together with an 8 mil thick section of a film of the polyhydroxyether as in Example 1. The aluminum strips, one inch wide, were overlapped ½ inch over the film, pressed at low pressure between platens heated to 700° F. for 20 seconds. The bond was subjected to a load of 1600 p.s.i. in a model LC Tinius-Olsen tensile testing machine. This test is patterned after Mil. Spec. A–5090–D test No. 9 which requires endurance for 192 hours of a 1600 p.s.i. load at 75° F. with less than 0.015 inch deformation.

Three specimens prepared as above were tested at 1600 p.s.i. for at least 192 hours at 75° F.; creep measurements were made with an instrument accurate to 0.00005 inch. The specimens showed zero deformation at the conclusion of the test.

In contrast a thermosetting epoxy resin widely employed as a creep resistant bonding material showed, in this test, under 1600 p.s.i. bonding for 192 hours at 73° F. 0.0016 inch creep.

EXAMPLE 23

Two specimens prepared as in Example 22 were tested at 800 p.s.i. for 192 hours but at 180° F. The three specimens showed a zero creep when measured with an instrument accurate to 0.00005 inch.

EXAMPLE 24

The usefulness of aluminum/aluminum laminates is illustrated by a structural element such as a reaction vessel fabricated of (1) an ultra pure aluminum, which is highly chemical resistant but poor in mechanical properties and (2) polyhydroxyether and (3) ordinary aluminum which has relatively poor chemical resistance but good mechanical properties. The laminate can be cold formed into the desired shape with the pure aluminum on the interior providing a strong, chemical resistant vessel.

Other aluminum structures, such as window frames, can also be fabricated using polyhydroxyether as the fastener.

Tensile Fatigue

EXAMPLE 25

A bond was prepared as in Example 22 but with a 3/8" overlap of the aluminum strips. The tensile fatigue test was patterned after Mil. Spec. A–5090–D test No. 8 which requires $10^6$ cycles at a 750 p.s.i. load.

Two specimens were tested for over $10^6$ cycles at an 800 p.s.i. load without failure, thus exceeding test requirements.

Bend

EXAMPLE 26

An aluminum/polyhydroxyether laminate was prepared as in Example 22. The bend test was patterned after that described by Epstein, in Adhesion of Metals, p. 130. U.S. Air Force requirement is 150 pounds. The average result for 10 specimens was 257 pounds.

Impact Strength

EXAMPLE 27

Two blocks, one 1" x ½" x 3/8" and another 1¼" x 1" x ¾" were bonded together so as to give ½ square inch of bond area with a polyhydroxyether of 2,2-bis(4-hydroxyphenyl)propane and epichlorohydrin prepared as in Example 1, but having a melt flow of 0.96. Bonding was between platens heated to 700° C. for one minute. Film thickness was 8 mils. Test was according to ASTM 950–54; five specimens were used. Average impact strength was 30 foot pounds/square inch.

EXAMPLE 28

Example 27 was duplicated with a polyhydroxyether having a melt flow of 15.5 and with bonding for 50 seconds. Average impact strength for 5 specimens was 26 foot pounds/square inch.

The foregoing examples illustrate bonding of thermoplastic polyhydroxyether to aluminum. Results with aluminum substrates are generally regarded in the industry as typical of adhesive properties of a material, hence a material showing outstanding adhesion to aluminum, as thermoplastic polyhydroxyether is evidenced to do in the preceding examples, would be expected to adhere well to most other metal substrates. That this is in fact true is shown by the following examples.

In these examples the polyhydroxyether used was prepared from 2,2-bis(4-hydroxyphenyl)propane and epichlorohydrin as in Example 1. Melt flow of the resin was 0.96. Metal-to-metal bonds were in each instance prepared by holding the metal-film-metal assembly at nominal pressure in a press electrically heated to 700° F. for the stated time.

EXAMPLE 29

A 0.008 inch thick section of thermoplastic polyhydroxyether having a melt flow of 0.96 was used to form a laminate of "Bonderite" cold rolled steel. Heating was for 40 seconds. Specimens prepared had lap shear strengths ranging up to 2500 p.s.i.

EXAMPLE 30

Example 29 is duplicated but substituting aluminum (0.064 inch thick) for one of the steel panels. Lap shear strength tests show excellent bonding to be achieved.

EXAMPLE 31

Example 29 is duplicated but substituting silver foil for one of the steel panels. Lap shear strength tests show excellent bonding to be achieved. This laminate is useful at the silver surface as a bearing surface.

EXAMPLE 32

Example 29 is duplicated but substituting gold foil for one of the steel panels. Lap shear strength tests show excellent bonding to be achieved.

EXAMPLE 33

Example 29 is duplicated but substituting platinum foil for one of the steel panels. Lap shear strength tests show excellent bonding to be achieved.

EXAMPLE 34

Example 29 is duplicated but substituting tantalum sheet for one of the steel panels. Lap shear strength tests show excellent bonding to be achieved.

EXAMPLE 35

Example 29 is duplicated but substituting titanium sheet for one of the steel panels. Lap shear strength tests show excellent bonding to be achieved.

EXAMPLE 36

Example 29 is duplicated but using aluminum sheet and 5 mil stainless steel as the adherends. A chemical resistant (from use of stainless steel) but light (from the use of aluminum) structural element is obtained.

Examples 32 through 36 typify laminates ideal for chemical reactors where not only is strength required but also extraordinary chemical resistance.

EXAMPLE 37

Example 29 was duplicated substituting galvanized steel cleaned with Alconox and Kirkman's cleanser for the cold rolled steel. Lap shear strength was 1870 p.s.i.

EXAMPLE 38

Example 29 was duplicated substituting copper cleaned with a wire wheel for the cold rolled steel. Lap shear strength was 1244 p.s.i.

Another significant advantage of thermoplastic polyhydroxyether is brought out by Example 38. Thermosetting epoxy resins do not bond well to copper because of the metal interfering with the cure reaction. Thermoplastic polyhydroxyether, however, needs no cure and gives bonds of excellent strength with copper surfaces.

EXAMPLE 39

Example 37 was duplicated substituting stainless steel for the cold rolled steel. Lap shear strength was 2476 p.s.i.

EXAMPLE 40

Example 39 was duplicated but the stainless steel was cleaned with Wyandotte cleanser and acid etched. Lap shear strength was 3224 p.s.i.

EXAMPLE 41

Example 39 was duplicated but the stainless steel was cleaned with Prebond "700" of the Bloomingdale Rubber Co. Lap shear strength was 2720 p.s.i.

EXAMPLE 42

Example 39 was duplicated but the stainless steel was cleaned with Hughson paste cleaner. Lap shear strength was 2344 p.s.i.

EXAMPLE 43

Example 38 was duplicated substituting nickel silver for copper. Heating was for 20 seconds. Lap shear strength was 1388 p.s.i.

EXAMPLE 44

Example 29 was duplicated substituting tin plate (tin can stock) cleaned with methyl ethyl ketone for the cold rolled steel. Heating was for 20 seconds. The bond was not quantitatively measured but good adhesion was obtained.

EXAMPLE 45

Example 43 was duplicated substituting brass for the nickel silver. Lap shear strength was not quantitatively measured. Good adhesion was obtained.

Other uses for polyhydroxyethers in metal to metal bonding include fastening of metal articles such as letters and numerals to metallic or ceramic or other substrates, bonding of propellers to drive shafts, fixing of handles onto metal, especially iron and aluminum pots, and metal doors. In general polyhydroxyether can be employed as a substitute for metal solder in joining wires, for example, or tail pipes and mufflers, railroad rails, shaped metal pieces such as fenders on automobiles, as ductwork in air conditioning and heating systems and in assembling jewelry.

In bonding with polyhydroxyether in the above applications the polyhydroxyether is suitably applied as a hot melt, e.g. as solder in the gaps in sheet metal work. Hot melt polyhydroxyether can be obtained directly from a gun type apparatus or be formed in situ by use of a blow torch or a soldering iron. Other means of bringing the polyhydroxyether to the bonding area include coating with film or from solution, as a thread dope to pipe ends to be joined and heating the joint to 500–700° F. Also the entire fitting e.g. T or elbow can be fabricated of polyhydroxyether or laminate thereof and the pipe ends inserted therein thereto.

A further use of polyhydroxyether in metal to metal laminates is as the bond between the dissimilar metals, e.g. iron and brass constituting a thermocouple or other bimetallic element.

Still another use is in the provision of bearing surfaces by use of a strong substrate, e.g. steel, a layer of polyhydroxyether and a layer of suitable bearing material e.g. silver, copper/lead alloy or lead/tin alloy (Babbitt). Of course noncontinuous bearing materials useful as solid state lubricants such as molybdenum disulfide and graphite can be bonded to a polyhydroxyether surface e.g. by spraying heated particles (ca. 600° F.) against the polyhydroxyether or by incorporating a sufficient quantity of the particles in polyhydroxyether by melting or by equivalent techniques.

EXAMPLE 46

The procedure of Example 1 was used with cold rolled steel sheet (cleaned with chromic acid) and 4 plies of one mil film (melt flow 5.0) forming the bond. Lap shear strength was 1440 p.s.i.

The following examples illustrate the fabrication of polyhydroxyether coated metal substrates.

EXAMPLE 47

A thick stack of film plies of the polyhydroxyether of 2,2-bis(4-hydroxyphenyl)propane and epichlorohydrin prepared as in Example 1 and having a melt flow of 5.0 was placed in the center of a 6 inch square cleaned aluminum sheet. The arrangement was placed between platens heated to 700° F. for 20 seconds. The platen next to the film was protected by silicone treated foil. A coating 3–7 mils thick was obtained on the aluminum sheet. The coating remained on after stripping of "Scotch" tape (trademark of Minnesota Mining and Mfg. Co. for cellophane tape) therefrom and after impact with a sharp instrument on the reverse side of the coated aluminum sheet.

EXAMPLE 48

Example 47 was duplicated but substituting copper sheet for the aluminum sheet. Adhesion of the coating to the copper was outstanding.

EXAMPLE 49

Example 47 was duplicated but substituting brass sheet for the aluminum sheet. Adhesion of the coating to the brass was outstanding.

EXAMPLE 50

Example 47 was duplicated but substituting steel sheet for the aluminum sheet. Adhesion of the coating to the steel was very good.

EXAMPLE 51

Example 47 was duplicated but substituting stainless steel sheet for the aluminum sheet. Adhesion of the coating to the stainless steel was good.

EXAMPLES 52–56

Each of the polyhydroxyether metal laminated structural elements prepared in Examples 47–51 was cold formed into shallow receptacles in a cold forming die. No delamination occurred in the cold forming.

Other structural elements having cold forming capabilities can be fabricated from relatively thick sections of polyhydroxyether and relatively thin sections of metal. This was ilustrated in Example 6 above. A further example is the bonding of 10 mil stainless steel to 60 mil polyhydroxyether in a press at nominal pressure until the interface temperature is about 600° F. and cooling and cold stamping into useful shapes e.g. luggage having a stainless steel exterior and a polyhydroxyether interior, or conversely an article like a sink having a stainless steel interior and a polyhydroxyether exterior.

Another use of metal/polyhydroxyether laminates is in photoelastic stress analysis. The adhesion of polyhydroxyether to metal and the ability of the polymer to polarize light make it ideal for this application.

Other metal to metal bonding applications include cable splicing and adhering of ribs to planar surfaces. As with other applications herein described frequently one of the metals can be replaced in toto by polyhydroxyether, e.g. a polyhydroxyether rib or planar surface self-fastened, i.e. by fusion, to a metal planar surface or rib. Still other uses are as vibration dampers e.g. lead/polyhydroxyether laminates or lead/rubber/polyhydroxyether or rubber/polyhydroxyether laminates.

A highly particularized use is as a heat sensitive element, e.g. as a stop for fire doors. By adjustment of the chemical composition of the polyhydroxyether and the stress in the application, the element could be made to melt and allow doors to close automatically in the event of fire.

EXAMPLE 57

In a continuous manner, four plies of a 0.5 mil film of the polyhydroxyether of 2,2-bis(4-hydroxyphenyl) propane and epichlorohydrin were interleaved between four plies of heated (>600° F.) 8 mil steel sheet drawn from rolls. The resulting structural element is a multiply laminate, coated on one side, which can be sheared and cold bent into a U-shaped section, for example, without delamination.

In order to impart attractiveness and environmental resistance to lower cost carbon steel there can be applied a thin "veneer" of stainless steel. This can be done in a uniquely advantageous manner with the thermoplastic polyhydroxyether as illustrated in

EXAMPLE 58

The equipment used comprised electrical heating elements and squeeze roll stations in series. Thermoplastic polyhydroxyether prepared as in Example 1 and having a melt flow of 2.5 was used.

Station 1 comprised two silicone rubber rolls and was placed directly after the first heating stage.

Station 2 was a set of driven steel rolls in a horizontal mill having variable nip pressure.

The driven steel rolls provide the power to pull the material through at a rate of about 50 feet per minute.

Carbon steel base metal (0.025 inch thick) is preheated by a first set of electrical heating elements to about 350° F. and then die coated with 0.5 mil film (melt flow 2.5) ironed on by the silicone rubber rolls. The coated carbon steel is electrically heated to 600° F. Meanwhile, gas fired heaters play on the top side of 5 mil stainless steel strip and heat it to about 500° F. The two strips are ironed together in the steel rolls and cooled by water spray. The laminate can be bent without failure of the bond.

EXAMPLE 59

A strip of stainless steel one inch wide and 0.0035 inch thick was bonded to carbon steel using the technique and polyhydroxyether film of Example 1.

EXAMPLES 60–70

Factors affecting the lap shear strength obtained when laminating steel to steel with polyhydroxyether were evaluated by varying melt flow laminating temperature and initial film thickness.

In each of the following runs the steel was surface pretreated with 150 to 350 milligrams of zinc phosphate per square inch (Bonderite #100 panels).

The panels measured 6″ x 3″ and were aligned for a ½″ longitudinal overlap using as an interlayer a film of polyhydroxyether reaction product to 2,2-bis(4-hydroxyphenyl)propane and epichlorohydrin prepared as in Example 1. The steel panels were sandwiched between aluminum foil and then 0.050″ steel plates to prevent platen damage. The assembly was then placed between preheated platens, held at nominal pressure for a dwell time of from only 5 seconds to as much as 30 minutes and moved to a cooling press (390° F.) and cooled in 5 minutes. The 6″ by 3″ overlapped and bonded panels were then cut into 1″ wide test specimens and tested according to ASTM D1002. The surprisingly great bond strengths obtained with very brief dwell times should be noted below:

TABLE V

| Example | Polyhydroxyether melt flow | Platen temperature (° F.) | Dwell time (sec.) | Film thickness (mils) | Lap shear strength (p.s.i.) |
| --- | --- | --- | --- | --- | --- |
| 60 | 0.6 | 730–740 | 5 | 4 | 2,490 |
| 61 | 8 | 730–740 | 5 | 4 | 2,640 |
| 62 | 15.5 | 730–740 | 5 | 4 | 2,540 |
| 63 | 25 | 730–740 | 5 | 4 | 2,630 |
| 64 | 6 | 730–740 | 5 | 4 | 2,520 |
| 65 | 6 | 730–740 | 5 | 6 | 2,500 |
| 66 | 6 | 730–740 | 5 | 8 | 2,590 |
| 67 | 6 | 730–740 | 5 | 4 | 2,560 |
| 68 | 1 | 700 | 40 | 8 | 2,470 |
| 69 | 1 | 500 | 900 | 8 | 2,450 |
| 70 | 1 | 400 | 1,800 | 8 | 1,480 |

A control was run with these results:

Diglycidylether of 2,2-bis(4-hydroxyphenyl)propane cured with triethylamine.    Thermo-setting epoxy-cured 2,420 p.s.i. 3 hrs. at 175° F. 2¼ hrs. at 210° F. plus ½ hr. at 250° F.+3 hrs. at 300° F.

It will be noted that the bonding temperatures used in Examples 60–68 are surprisingly high. We have discovered, however, and it is demonstrated in Table V that the use of bonding temperatures considerably above the temperatures used in extrusion and molding of the same resin and which are considered to degrade the resin actually confers important benefits in bonding. No degradation occurs because of the very brief exposure times employed. Bond strength are startlingly great.

Induction heating can also be used to activate the polyhydroxyether into bonding in a 3-ply laminate. Coatings can be similarly made.

EXAMPLE 71

A piece of film of the polyhydroxyether of 2,2-bis-(4-hydroxyphenyl)propane and epichlorohydrin prepared as in Example 1 and having a melt flow of 3.0 is placed on a cleaned cold rolled steel panel. The assembly is placed within the coils of a 5 kilowatt induction heater set to near capacity. In about seven seconds the polyhydroxyether is melted onto the steel. The assembly is removed from the induction heater and a ¾″ in diameter aluminum bar is pressed endwise against the melted resin with hand pressure. After about one minute the bar is broken free. The thermoplastic polyhydroxyether is well bonded to the steel.

In the preceding examples use has been made of the film form of the thermosplastic polyhydroxyethers to bring the resin to the substrate. In the following examples, techniques employing other forms of the thermoplastic polyhydroxyethers are illustrated.

EXAMPLE 72

A coating solution was prepared by dissolving a polyhydroxyether of 2,2-bis(4-hydroxyphenyl)propane and epichlorohydrin prepared as in Example 1 and having a melt flow of 1.0 in sufficient tetrahydrofuran to make a 20% solution. Steel panels which had been wiped clean and solvent degreased were dipped into the solution. The panels were removed from the solution and baked in an oven at 350° F. to a one mil coating thickness. The coated panels were tested for quality of coating adhesion. In the Scotch tape test no lifting of the coating occurred. Gardner bump impact of 160 inch-pounds did not cause delamination. The panels were bent over a conical mandrel with no delamination.

The adhesion obtained in this example is fully equivalent to adhesion obtained with vinyl/maleic anhydride copolymer non-priming coating compositions and the coating of polyhydroxyether has the further advantage of higher heat resistance. Another proof of good thermoplastic polyhydroxyether adhesion is that no underfilm corrosion occurred around cuts in the film in samples tested under salt spray.

Additional advantages of solution coatings of thermoplastic polyhydroxyether include resistance to degradation by acids and alkalies. Moreover, thermoplastic polyhydroxyethers are thermally stable and hence resistant to overbake.

EXAMPLE 73

A coating solution prepared in Example 71 but containing 25% polyhydroxyether was coated onto cleaned and degreased steel panels to a thickness of one mil. The panels were air dried for 30 minutes and then baked at 150° C. for 15 minutes. The adhesion obtained was excellent. No delamination occurred when the panels were subjected to 160 inch-pound bump on a Gardner impact tester.

EXAMPLE 74

A coating solution was prepared by dissolving a polyhydroxyether of 2,2-bis(4-hydroxyphenyl)propane and epichlorohydrin prepared as in Example 1 in chloroform to form a 20% solution. A number of inch wide strips of aluminum were coated for a distance of one inch with the solution and allowed to dry. The coated areas of the strips were pressed together in a laboratory press at 150–200° C. and at pressures ranging from nominal (contact) to 200 p.s.i., for times ranging from 5 to 30 minutes. Lap shear strengths of from 204 to 1630 p.s.i., were obtained with higher bonding temperatures providing higher bond strengths.

EXAMPLE 75

The polyhydroxyether of 2,2-bis(4-hydroxyphenyl)propane and epichlorohydrin prepared as in Example 1 is pelletized and a pile of the pellets is placed on a 6 inch by 6 inch square of one mil thick foil. The sheet is then inserted within the coils of 5 kilowatt induction heater having 8 turns in a one inch diameter coil and heated to 600° F. by constantly moving the foil between the coil turns. The pellets melt and the melt is pressed against the panel to coat the aluminum sheet. Adhesion is excellent.

EXAMPLE 76

Polyhydroxyether of Example 1 was ground to a powder and placed in a porous bottomed container. Air was blown through the powder from the porous bottom forming a fluidized bed of polyhydroxyether. An aluminum panel was preheated in an oven at 600° F. for 5 minutes and then held in the fluidized bed. The panel was withdrawn and given an intermediate bake at 600° F. for one minute and reinserted in the fluidized bed. Three dips and three bakes are given. A tenaciously adherent, smooth coating over the panel was obtained.

The examples thus far have illustrated bonding of thermoplastic polyhydroxyethers to one or more similar or dissimilar metallic substrates.

Substrates other than metals can also be advantageously coated and/or bonded to similar or dissimilar metallic, nonmetallic, porous, nonporous, rigid, and nonrigid substrates using thermoplastic polyhydroxyethers.

An example of other substrates are rigid and non-rigid synthetic organic thermoplastic material such as the normally solid polar homopolymers and copolymers, such as poly(alkyl acrylates), polycarbonates, polystyrene, polyesters, poly(vinyl chloride), poly(vinyl acetate) nitrile rubber and the like.

Another example of other substrates is organic thermosetting materials such as filled synthetic resins e.g. phenol, formaldehyde and melamine formaldehyde resins. Unfilled thermosetting resins can be laminated to polyhydroxyether also, when final cure of the resin is effected after coating with polyhydroxyether from the melt, or solution or as film.

EXAMPLE 77

An asphalt flooring tile is laminated to a film of a polyhydroxy ether prepared as in Example 1 by holding the assembly in a heated press until the interface temperature is about 300° F. Bonding is excellent.

EXAMPLE 78

Example 77 is duplicated but simultaneously laminating a steel panel to the other side of the polyhydroxyether. Bonding is excellent.

EXAMPLE 79

Example 78 is duplicated but the polyhydroxyether is pre-laminated to the steel panel at 600° F. and this laminate is bonded to the tile at 300° F.

EXAMPLE 80

Example 78 is duplicated but substituting a plywood panel for the steel panel. Bonding is excellent.

EXAMPLE 81

Example 77 is duplicated but using as a tile asbestos filled poly(vinyl chloride). The bond obtained is excellent.

Filled phenolic resin compositions e.g. with asbestos, used for example as clutch facings or brake linings can be bonded to clutch plates or brake shoes respectively with polyhydroxyether. Further the shoes themselves can be bonded with polyhydroxyether rather than riveted together.

EXAMPLE 82

A film of the polyhydroxyether of Example 1 was laminated to a polyethylene film which had been electrostatically treated, in a laminating press at a pressure of 100 p.s.i. and at a temperature of 300° F. for one minute.

A bond exceeding the strength of the polyethylene was obtained.

EXAMPLE 83

Example 82 was duplicated but substituting biaxially oriented polystyrene film for the polyethylene film. The bond obtained exceeded the strength of the polystyrene film.

EXAMPLE 84

Example 82 was duplicated but substituting unoriented polystyrene film for the polyethylene film. The bond obtained exceeded the strength of the polystyrene film.

EXAMPLE 85

Example 82 was duplicated but substituting Mylar film (trademark of E. I. du Pont de Nemours & Co. for polyethylene terephthalate copolymer) for the polyethylene film. Excellent adhesion was obtained.

EXAMPLE 86

A 40 mil thick plaque of a polycarbonate prepared from 2,2-bis(4-hydroxyphenyl)propane and phosgene was laminated with a 20 mil thick plaque of a polyhydroxyether of 2,2-bis(4-hydroxyphenyl)propane and epichlorohydrin in a laboratory press at 180° C. The laminate was drawn down to a thickness of 3–4 mils at 290° F. in a laboratory thermoforming orientation device known as a Formvac. No delamination occurred. Adhesion was observed to be good.

EXAMPLE 87

Aluminum foil was extrusion coated with thermoplastic polyhydroxyether of 2,2-bis(4-hydroxyphenyl)propane and epichlorohydrin prepared as in Example 1 and having a melt flow of 1.9. The apparatus included a supply roll from which the foil was unrolled, an 2.5" extruder fitted with a 20 mil slit die. Throughput was 44.4 pounds/hour. Compound temperature was 600° F. Draw span, distance from die lip to nip, was 2.5 feet. The nip was formed between a chilled stainless steel roll and a silicone coated roll. Coatings were at thickness of 0.2, 0.5 and 1.5 mil. Good adhesion was obtained.

EXAMPLE 88

Example 87 was duplicated but substituting for the aluminum foil #18 kraft paper preheated to 220° F. prior to coating. Coating thickness was 0.5 mil. Adhesion was good.

EXAMPLE 89

Example 87 was duplicated but substituting cellophane (regenerated cellulose) for aluminum foil. Coating thickness was 0.5 mil. Adhesion was good.

EXAMPLE 90

A 5 mil stainless steel foil pre-coated at 600° F. with a 2 mil film of polyhydroxyether is bonded to 40 mil X-creped paper by holding in a heated press at nominal pressure until a glue line temperature of 300° F. is achieved. The resulting structural element is cold formable into tiles or the like. If desired a polyhydroxyether backing can be provided on the tile to enable adhesion to any substrate. Also a large sheet of polyhydroxyether, e.g. 48" x 96", can be used as a backing for a number of tiles.

EXAMPLE 91

Structural elements are fabricated from polyhydroxyether and poly(ethylene isophthalate/terephthalate)copolymer.

EXAMPLES 92–93

The structural element of Example 91 is bonded at about 300° F. glue line temperature to steel panels and to wood providing a chemical resistant surface for the steel and wood.

This same technique can be practiced with the structural elements prepared in Example 96.

EXAMPLE 94

A hammer head is bonded to its handle using hot melted polyhydroxyether.

EXAMPLE 95

Pages of a book are bonded to one another and to a cover therefor with thermoplastic polyhydroxyether applied either from solution as film, or a melt. The cover can be cellulosic or a laminate of a cellulosic material e.g. cardboard, and cloth or the like and polyhydroxyether film.

EXAMPLE 96

Example 87 was duplicated but substituting polyethylene terephthalate copolymer for aluminum foil. Coating thickness was 0.5 mil. Adhesion was good.

In each of Examples 87–96 the coatings showed tenacious adhesion to the substrate.

In addition to metallic substrates and synthetic organic thermoplastic substrates thermoplastic polyhydroxyethers exhibit outstanding adhesion to and between cellulosic substrates as is illustrated in Examples 88 and 89 and in the following examples.

EXAMPLE 97

A 2 mil thick film of a polyhydroxyether of 2,2-bis(4-hydroxyphenyl)propane and epichlorohydrin prepared as in Example 1 and having a melt flow of 0.5 was laid on a sheet of plywood and the assembly was placed in a press heated to 300° F. platen temperature. Platens were silicone treated to prevent sticking. The press was closed on the assembly at 240 p.s.i. for 2 minutes, then cooled. The plywood was evenly coated with the polyhydroxyether. Adhesion was so good that attempts to lift the coating resulted in the lifting of wood fibers from the plywood surface.

The above example illustrates noncontinuous coating of wood. The following examples illustrate continuous surfacing of plywood.

EXAMPLE 98

A 3 mil thick film of a polyhydroxyether of 2,2-bis(4-hydroxyphenyl)propane and epichlorohydrin prepared as in Example 1 and having a melt flow of 2 was continuously laminated to plywood as follows. The wood surface was cleaned with wire brushes, and then preheated to 200–225° F. The heated plywood was passed to the nip of a pair of rollers. The lower roller was steel and the upper one was a silicone rubber roll protected with release paper and heated to 300° F. The bond obtained was strong enough to cause wood failure upon removal of the film. It is important to note that a continuous laminate was achieved without the use of any adhesive or intermediate agents to promote adhesion.

EXAMPLE 99

The laminating technique was that of Example 98, except that there was fed to the nip a one mil film of 5.0 melt flow polyhydroxyether (prepared as in Example 1) and a 0.036 inch thick birch veneer. The resulting coated veneer was then laminated to ⅝" thick plywood by first placing on the plywood a one mil film of the same polyhydroxyether and then the coated veneer (coated side up), and heating the assembly at 100 p.s.i. in a press heated to 300° F. for three minutes. Upon cooling the surfaced veneer was found to be very well bonded to the plywood base sheet.

The technique illustrated in this example is equally applicable to cloth backed veneers.

To demonstrate the bonding strength superiority provided of thermoplastic polyhydroxyether in addition to processing convenience there is presented

EXAMPLE 100

Lap shear specimens were prepared according to ASTM D–906–49 employing as the adhesive (Example 99) thermoplastic polyhydroxyether of 2,2-bis(4-hydroxyphenyl)propane and epichlorohydrin prepared as in Example 1 or (control) resorcinol-formaldehyde adhesive. The bonding was effected by applying even amounts of a powdered polyhydroxyether between pairs of three ¹⁄₁₆" birch veneers (alternated by grain) at the rate of 20 pounds/1000 square feet; and by applying a like amount of the two component resorcinol system. The polyhydroxyether bond was simply made by compressing the structural element at 200 p.s.i. and 300° F. for only 5 minutes. The resorcinol system was cured for 3.5 hours at 200 p.s.i. and 90° F. Lap shear test specimens were cut and were aged at a constant 73° F. for 7 days. The resorcinol adhesive, considered a premium adhesive in the art had a shear strength of 622 p.s.i. and the test resulted in about 75% wood failure. The thermoplastic polyhydroxyether bond had a surprisingly great shear strength of 743 p.s.i., with about 75% wood failure.

Thus though much more simply made the thermoplastic polyhydroxyether bonded plywood is stronger.

EXAMPLE 101

Example 100 was duplicated but incorporating three parts of a foaming agent, azodicarbonamide, in the polyhydroxyether powder. Considerable gassing and foaming occurred on bonding. Lap shear strength was increased to 813 p.s.i.

As with other substrates the thermoplastic polyhydroxyethers can be placed on plywood as a film, sheet, solution, pellets, powder or melt or in other ways as indicated by the following example.

EXAMPLE 102

Sheets of plywood ¼" x 6" x 8" were coated by an extrusion laminating process with a polyhydroxyether of 2,2-bis(4-hydroxyphenyl)propane and epichlorohydrin prepared as in Example 1 and having a melt flow of 8.0. The equipment was a 1" extruder having a 6" center fed die with a lip opening of 0.015 inch. Temperatures along the extruder were: rear 400° F., front 425° F., and die 425° F. The takeoff rolls were 6" diameter rubber rolls. Take-off rate was about 5 feet/minute. The plywood was preheated under a hot air heater to about 200° F. just before the die. Nip rolls were set to maximum tightness on the plywood after the resin was applied. Plywood having a thermoplastic polyhydroxyether coating of 5 to 10 mils was obtained. Adhesion was excellent.

Plywood type structural elements can be prepared in still another manner as illustrated in

EXAMPLE 103

Aluminum foil, 5 mils thick, was laminated on either side to 3 mil thermoplastic polyhydroxyether films by pressing at 600° F. for one minute. This laminate was inserted between two ¹⁄₁₆" wood veneers (grains at 90°) and the assembly was then clamped in an unheated press at 250 p.s.i. A current of 70 amps. and voltage of 1.5 volts was applied to the aluminum foil. Resistance heating of the foil developed temperatures of 400° F. and the film fused to the wood. Good bond strengths were obtained.

Synthetically prepared substrates can also be coated/or bonded to various substrates with thermoplastic polyhydroxyether as shown in the following example.

EXAMPLE 104

A particle board was prepared by mixing and cold compressing into a sheet, a mixture of 93.25% wood particles, 6% (solids basis) water soluble alkaline catalyzed phenol-formaldehyde resin (added as a 43% aqueous solution) and 0.75% wax (Paracal 404N sold by Hercules Powder Co.) (added as a 40% aqueous solution).

There was placed on the particle board a 5 mil thick film of a polyhydroxyether of 2,2-bis(4-hydroxyphenyl)

propane and epichlorohydrin prepared as in Example 1 and having a melt flow of 3.0 and then an aluminum sheet (0.024" thick) which had been cleaned with chromic acid. The assembly was placed in a press, the platens of which had been preheated to 340° F. and compressed for 14 minutes at 400 p.s.i. The aluminum was well bonded and could be removed only by stripping off wood particles as well.

A thermal cycling test was carried out as is customary with molded particle board. The aluminum faced particle board was immersed in boiling water 3 hours, then immediately held at 0° F. for 20 hours then, immediately held in oven at 212° F. for 24 hours.

The structural element could still not be delaminated without stripping wood particles.

EXAMPLE 105

Example 104 was duplicated but the aluminum sheet and polyhydroxyether film were prelaminated together by compression laminating at 500° F. and 65 p.s.i. for 60 seconds. As in Example 104 the aluminum could not be removed without stripping off wood particles as well.

The thermal cycle test was carried out and no delamination occurred.

EXAMPLE 106

Paper impregnated with a thermosetting diallyl phthalate resin was bonded to steel. The steel was 0.026 inch thick Bonderite #100 panels. The steel panels were coated with thermoplastic polyhydroxyether by molding a 31 melt flow resin against the panel surface at 700° F. for 10 seconds at nominal pressure and at 30 p.s.i. for 20 seconds and quickly cooling. The coating was 5–7 mils. The B-stage resin impregnated paper was laid against the coated steel and cured as usual for the paper: 6 minutes at 360° F. platen temperature and 30 p.s.i.

The resulting structural element was a steel panel with a tough clear coating well bonded to the steel.

The thermoplastic polyhydroxyethers in the present invention have the general formula

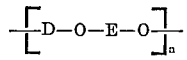

wherein D is the radical residuum of a dihydric phenol, E is a radical residuum of an epoxide selected from mono- and diepoxides and contains from 1 to 2 hydroxyl groups and $n$ is an integer which represents the degree of polymerization and is at least 30 and preferably is above about 80.

In general, thermoplastic polyhydroxyethers are prepared by contacting under polymerization conditions a dihydric phenol and an epoxide containing from 1 to 2 epoxide groups in substantially equimolar amounts. Ordinarily from 0.985 to 1.015 moles and preferably one mole of the epoxide is employed per mole of dihydric phenol. Polymerization occurs at room temperature (25° C.) and lower but only slowly, hence ordinarily, an elevated temperature e.g. 40° C. to 250° C. or more preferably from 80 to 125° C. is used to ensure a rapid rate of polymerization. Pressure is not at all critical, with polymerization being successfully effected at atmospheric, subatmospheric, or superatmospheric pressure with or without an inert gas such as nitrogen in the reaction vessel.

In particular, to prepare a polyhydroxyether from a dihydric phenol such as bisphenol-A and a monoepoxide such as epichlorohydrin, there is placed in a reaction vessel from 0.985 to 1.015 moles of the epichlorohydrin, preferably one mole, per mole of bisphenol-A together with about 0.6 to 1.4 moles, preferably from about 1.02 to 1.25 moles per mole of dihydric phenol of an alkali metal hydroxide such as sodium hydroxide, potassium hydroxide, lithium hydroxide and the like, added entirely initially or 5 to 50 percent added stepwise over the course of the reaction, generally in an aqueous medium and the mixture is heated at a temperature of about 10° C. to about 50° C. preferably from about 20° C. to about 40° C. to effect a coupling of the reactants, adjusting, if necessary, the amounts of alkali metal hydroxide in the reaction mixture so that the final concentration of alkali in the aqueous phase of the reaction mixture at the completion of the reaction is between about 0.1 and 1.2 molal and preferably between about 0.3 and 0.6 molal, and heating the reaction mixture at a temperature of from about 60° C. to boiling or reflux or higher under pressure to obtain a polyhydroxyether having the desired molecular weight.

The product produced by the foregoing reaction between bisphenol-A and epichlorohydrin has the repeating unit

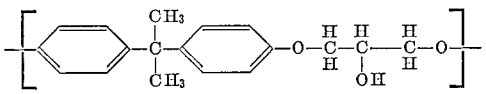

and can be termed a poly(monohydroxyether) of bisphenol-A.

To prepare a polyhydroxyether from a dihydric phenol such as hydroquinone and a diepoxide such as butadiene dioxide, there is placed in a reaction vessel from 0.985 to 1.015 moles of the butadiene dioxide per mole of hydroquinone, and the reactants are heated at a temperature from 10° C. to 250° C. particularly from 80 to 125° C. and, preferably at atmospheric reflux until there is obtained a polyhydroxyether of the desired molecular weight. Reaction under alkaline conditions is preferred. Pressure is not critical and reaction can be successfully effected at atmospheric, sub-atmospheric, or superatmospheric pressure with or without an inert gas such as nitrogen in the reaction vessel. It is not necessary, but it is generally desirable to employ an acidic or acid accepting compound as a catalyst for the reaction. Numerous compounds can be used and in catalytic amounts e.g. from 0.00005 to 3 percent and higher by weight based on the dihydric phenol. Among others there can be mentioned the hydroxides and alkoxides of the alkali metals, such as sodium, potassium and lithium hydroxides and sodium ethoxide; tertiary amines such as tribenzyl amine, as well as quaternary ammonium salts. Other suitable catalysts include the Lewis acids, and Friedel-Crafts catalysts, such as metal halides, e.g. zinc chloride, boron trifluoride and aluminum bromide as well as other acidic compounds.

The product produced by the foregoing reaction between hydroquinone and butadiene dioxide has the repeating unit

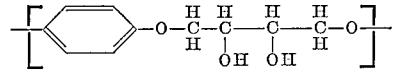

and can be termed a poly(dihydroxyether) of hydroquinone.

By the use of both a monoepoxide and a diepoxide poly-(hydroxy-dihydroxyethers) can be obtained, the relative amounts of mono- and diepoxide determining the final concentration of the mono- and dihydroxy containing repeating units E in the polymer.

Poly(hydroxy-dihydroxyethers) are prepared in the same manner as polydihydroxyethers except that there is additionally employed from 0.6 to 1.5 moles of alkali metal hydroxide per mole of dihydric phenol e.g. lithium, sodium or potassium hydroxide.

The dihydric phenol and epoxide can be contacted while fluid, i.e., while in solution or in the melt. Solution reaction is preferred for best heat transfer and highest degree of control over the reaction. Suitable solvents include, among others, hydroxylic solvents, e.g. water, methanol, ethanol, propanol-2, and n-butanol; ethers, e.g. dioxane, diethyl ether, dibutyl ether, diphenyl ether, dimethyl ether of ethylene glycol, and dimethyl ether of diethylene glycol; esters, e.g. ethyl acetate and propyl acetate; aromatic and aliphatic ketones, e.g. acetophenone, benzophenone, acetone, methyl ethyl ketone and methyl isobutyl ketone; aromatic hydrocarbons, e.g. benzene, toluene, o-, m- and p-xylene; halogenated aromatic hydrocarbons, e.g. carbon tetrachloride, methylene chloride and 1,1,2,2 - tetrachloroethane, amides, e.g. dimethylformamide and dimethyl acetamide; aliphatic hydrocarbons such as n-hexane, n-heptane and the like; cycloaliphatic hydrocarbons such as cyclohexane, n-propyl cyclohexane and the like; and sulfoxides e.g. dimethyl sulfoxide.

Polyhydroxyethers are high molecular weight, stable thermoplastic polymers which can be thermoformed into various useful contours such as films, sheets, molded articles and the like. Films of polyhydroxyethers are of special interest since they are flexible, clear and colorless, and have good oxygen and water vapor barrier properties. Articles molded of polyhydroxyethers are strong and tough, exhibiting high values in tensile modulus, tensile strength, elongation and pendulum impact.

The polyhydroxyethers herein taught are, as stated, thermoplastic in nature and are, therefore, to be sharply distinguished from thermosetting, curable "epoxy" resins now known which, according to U.S. Patent 2,503,726 to Greenlee, for example, can be prepared by the reaction of dihydric phenols, e.g., bisphenol-A, and polyepoxy compounds such as butylene dioxide (butadiene dioxide) and which can be represented by the formula

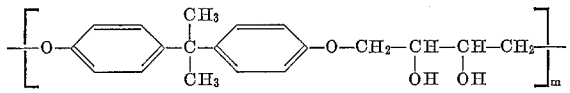

wherein $m$ is an integer from 2 to about 20 as a maximum. These low molecular weight epoxy resins are brittle and friable and do not possess adequate toughness for typical plastics applications unless reacted with other materials and converted to the thermoset state. They are, therefore, of no utility in injection molding applications and in formation of thin self-sustaining films.

Somewhat high molecular weight resins, which are obtained by reacting a dihydric phenol with epichlorohydrin, have apparently been disclosed by Carpenter et al. in U.S. Patent 2,602,075 issued July 1, 1952.

Any dihydric phenol can be used in forming polyhydroxyethers. Illustrative dihydric phenols are mononuclear dihydric phenols such as hydroquinone, resorcinol, and the like as well as the polynuclear phenols which are preferred. The dihydric polynuclear phenols have the general formula:

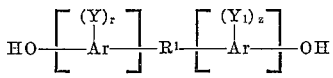

wherein: $Ar$ is an aromatic divalent hydrocarbon radical such as naphthylene and phenylene with phenylene being preferred for the thermoplastic polyhydroxyethers used in this invention; $Y$ and $Y_1$, which can be the same or different are alkyl radicals such as methyl, n-propyl, n-butyl, n-hexyl, n-octyl and the like, preferably alkyl radicals having a maximum of 4 carbon atoms; or halogen atoms, i.e., chlorine, bromine, iodine, or fluorine; or alkoxy radicals such as methoxy, methoymethyl, ethoxy, ethoxyethyl, n-butyloxy, amyloxy and the like, preferably an alkoxy radical having a maximum of 4 carbon atoms. It is to be understood that whenever there are substituents, exclusive of the hydroxyl groups on either or both of the aromatic divalent hydrocarbon groups, these substituents can be the same or different; $r$ and $z$ are integers having a value of from 0 to a maximum value corresponding to the number of hydrogen atoms on the aromatic ring ($Ar$) which can be replaced by substituents and can have the same or different values and $R^1$ is a bond between adjacent carbon atoms as in dihydroxydiphenyl or is a divalent radical, for example —C—, or —O—, or —S—, or —SO—, or —SO$_2$—, or —S—S—
∥
O or a divalent hydrocarbon radical as for example an alkylene radical such as methylene, ethylene, trimethylene, tetramethylene, pentamethylene, hexamethylene, 2-ethyl hexamethylene, octamethylene, nonamethylene, decamethylene, and the like; an alkylidene radical such as ethylidene, propylidene, isopropylidene, isobutylidene, amylidene, isoamylidene, 1-phenyl ethylidene and the like, or a cycloaliphatic radical, such as 1,4-cyclohexylene, 1,3-cyclohexylene, cyclohexylidene, and the like, or halogenated alkylidene, alkylene, or cycloalphatic radicals, alkoxy and aryloxy substituted alkylidene, alkylene or cycloaliphatic radicals, such as methoxy methylene, ethoxy methylene, ethoxy etheylene, 2-ethoxy trimethylene, 3-ethoxy-2-phenoxy trimethylene, 1,3-(2-phenoxy cyclohexane), and the like, aralkylene radicals, such as phenyl ethylene, 2-phenyl trimethylene, 1-phenyl pentamethylene, 2-phenyl decamethylene, and the like, aromatic radicals, such as phenylene, naphthylene, and the like, halogenated aromatic radicals, such as 1,4-(2-chlorophenylene), 1,4-(2-bromophenylene), 1,4-(2-fluorophenylene), and the like; alkoxy and aryloxy substituted aromatic radicals, such as 1,4-(2-n-propoxyphenylene), 1,4-(2-phenoxyphenylene), and the like, alkyl substituted aromatic radicals, such as 1,4-(2-methylphenylene), 1,4-(2-ethylphenylene), 1,4-(2-n-propylphenylene), 1,4-(2-n-butylphenylene), 1,4-(2-n-dodecylphenylene) and the like; or $R^1$ can be a ring which is fused to one of the $Ar$ groups as is the case, for example, in the compound having the formula:

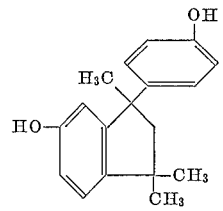

or $R^1$ can be a polyalkoxy radical such as polyethoxy, polypropoxy, polythioethoxy, polybutoxy, polyphenylethoxy; or $R^1$ can be a radical containing a silicon atom as, for example, polydimethylsiloxy, polydiphenylsiloxy, polymethylphenylsiloxy and the like; or $R^1$ can be two or more alkylidene radicals separated by an aromatic ring, a tertiary amino group, an ether linkage, a carbonyl group or separated by a linkage containing sulfur such as sulfide, sulfoxide and the like.

Particularly preferred are dihydric polynuclear phenols having the general formula:

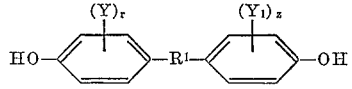

wherein $Y$, $Y_1$, are as previously defined, $r$ and $z$ have values of from 0 to 4 inclusive and $R^1$ is an alkylene or alkylidene group, preferably having from 1 to 3 carbon atoms inclusive or $R^1$ is a saturated group such as is obtained from compounds such as vinylcyclohexene and dipentene or its isomers by reaction with two moles of phenol per mole of the compound. $R^1$ preferably contains from 1 to 9 carbon atoms.

Thermoplastic polydhydroxyethers produced using the dihydric polynuclear phenols described in the preceding paragraph have extremely good mechanical properties. In addition, polyhydroxyethers produced using a dihydric polynuclear phenol wherein $R^1$ is the saturated group from vinylcyclohexene or dipentene or its isomers have heat distortion temperatures which are relatively high.

Examples of other specific dihydric phenols include among others the bis-(hydroxyphenyl)-alkanes such as 2,2-bis-(4-hydroxyphenyl)-propane,
2,4'-dihydroxy diphenylmethane,
bis-(2-hydroyphenyl)-methane,
bis-(4-hydroxyphenyl)-methane,
bis-(4-hydroxy-2,6-dimethyl-3-methoxyphenyl)-methane, 1,1-bis-(4-hydroxyphenyl)-ethane,
1,2-bis-(4-hydroxyphenyl)-ethane,
1,1-bis-(4-hydroxy-2-chlorophenyl)-ethane,
1,1-bis-(3-dimethyl-4-hydroxyphenyl)-ethane,
1,3-bis-(3-methyl-4-hydroxyphenyl)-propane,
2,2-bis-(3-phenyl-4-hydroxyphenyl)-propane,
2,2-bis-(3-isopropyl-4-hydroxyphenyl)-propane,
2,2-bis-(2-isopropyl-4-hydroxyphenyl)-propane,
2,2-bis-(4-hydroxynaphthyl)propane,
2,2-bis-(4-hydroxyphenyl)-pentane,
3,3-bis-(4-hydroxyphenyl)-pentane,
2,2-bis-(4-hydroxyphenyl)-heptane,
bis-(4-hydroxyphenyl)-phenylmethane,
bis-(4-hydroxyphenyl)-cyclohexylmethane,
1,2-bis-(4-hydroxyphenyl)-1,2-bis-(phenyl)-propane,
2,2-bis-(4-hydroxyphenyl)-1-phenylpropane and the like; di(hydroxyphenyl)sulfones such as bis-(4-hydroxyphenyl)sulfone,
2,4'-dihydroxydiphenyl sulfone,
5'-chloro-2,4'-dihydroxydiphenyl sulfone,
5'-chloro-4,4'-dihydroxydiphenyl sulfone, and the like; di(hydroxyphenyl)ethers such as bis-(4-hydroxyphenyl)-ether,
the 4,3'-, 4,2'-, 2,2'-, 2,3'-, dihydroxydiphenyl ethers,
4,4'-dihydroxy-2,6-dimethyldiphenyl ether,
bis-(4-hydroxy-3-isobutylphenyl)-ether,
bis-(4-hydroxy-3-isopropylphenyl)-ether,
bis-(4-hydroxy-3-chlorophenyl)-ether,
bis-(4-hydroxy-3-fluorophenyl)-ether,
bis-(4-hydroxy-3-bromophenyl)-ether,
bis-(4-hydroxynaphthyl)-ether,
bis-(4-hydroxy-3-chloronaphthyl)-ether,
bis-(2-hydroxydiphenyl)-ether,
4,4'-dihydroxy-2,6-dimethoxydiphenyl ether,
4,4'-dihydroxy-2,5-diethoxydiphenyl ether, and the like.

Also suitable are the bisphenol reaction products of 4-vinylcyclohexene and phenols, e.g., 1,3-bis(p-hydroxyphenyl)-1-ethylcyclohexane, and the bisphenol reaction products of dipentene or its isomers and phenols as well as 1,3,3-trimethyl-1-(4-hydroxyphenyl)-6-hydroxyindane, and 2,4-bis(4-hydroxyphenyl)-4-methylpentane, and the like.

Mixtures of dihydric phenols can also be employed and wherever the term "dihydric phenol" or "dihydric polynuclear phenol" is used herein, mixtures of these compounds are intended to be included.

The dihydric phenols which are used are substantially free of higher functional phenolic compounds, that is, phenols containing three or more phenolic hydroxyl groups, such as trihydric phenols or trisphenols. In general, the dihydric polynuclear phenols used should contain less than about 1.5 mole percent and preferably less than about 0.5 mole percent, based on the moles of dihydric polynuclear phenol, of such higher functional phenols.

The concentration of the higher functional phenolic compounds in the dihydric phenols can be readily measured by conventional chromatographic techniques such as described by W. M. Anderson, G. B. Carter and A. J. Landua in Analytical Chemistry 31, 1214 (1959) and if necessary, the dihydric phenol can be purified by recrystallization from a suitable solvent such as toluene.

More than about 1.5 mole percent of a higher functional phenolic compound can be tolerated in the dihydric phenols provided that an equivalent amount of a monohydric phenol is added in order to offset the increased functionality of the resultant system.

If desired, monohydric phenols can be added to the reaction mixture containing the dihydric phenol and the diepoxide at the start of the reaction or at any other convenient time during the course of the reaction. The monohydric phenols serve to regulate the molecular weight of the polydihydroxyether by acting as a chain terminator. When used as chain terminator, the monohydric phenols are used in amounts of from about 0.01 mole to about 0.05 mole, preferably about 0.01 mole to about 0.02 mole per mole of the dihydric phenol. This amount is in addition to the amount of monohydric phenol used for purposes of offsetting the presence of higher functional phenolic compounds as explained in the preceding paragraph. Illustrative of suitable monohydric phenols are the following: phenol, alkylated monohydric phenols such as m-cresol, ethyl phenol, p-tertiary butylphenol and the like; alkoxy monohydric phenols such as m-methoxyphenol, m-ethoxyphenol and the like; halogenated monohydric phenols such as m-chlorophenol, m-bromophenol and the like, and p-phenylphenol and the like.

Diepoxides useful for the preparation of polyhydroxyethers can be represented by the formula

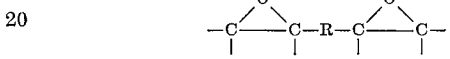

wherein R is representative of a bond between adjacent carbon atoms or a divalent inorganic or organic radical such as an aliphatic, aromatic, homocyclic, heterocyclic or acyclic arrangement of atoms.

By the term "diepoxide" is meant a compound containing two epoxide groups i.e. groups containing an oxirane oxygen atom bonded to two vicinal aliphatic carbon atoms. Saturated diepoxides in which both the oxirane oxygen atoms are bonded to carbon atoms of a saturated aliphatic hydrocarbon chain are particularly preferred. The term "saturated diepoxides" refers to diepoxides which are free of ethylenic unsaturation, i.e. $>C=C<$ and acetylenic unsaturation, i.e. $-C\equiv C-$. Diepoxides which contain solely carbon, hydrogen and oxygen atoms are especially preferred. The oxygen atoms can be (in addition to oxirane oxygen), ether oxygen, i.e. —O—; oxacarbonyl oxygen, i.e.,

carbonyl oxygen, i.e.

and the like. A single diepoxide or a mixture of at least two diepoxides can be employed in preparing the polydihydroxyethers of the present invention and the term "diepoxide" is intended to include a mixture of at least two diepoxides.

Illustrative diepoxides include, for example, the alkanediol bis(3,4 - epoxycyclohexanecarboxylates), the alkanediol bis(3,4 - epoxycyclohexanecarboxylates), the alkanediol bis(lower alkyl substituted - 3,4 - epoxycyclohexanecarboxylates), the oxaalkanediol bis(lower alkyl substituted-3,4-epoxycyclohexanecarboxylates), the oxaalkanediol bis(lower alkyl substituted-3,4-epoxycyclohexanecarbonates), and the like. Specific compounds which can be mentioned are:

diethylene glycol bis(3,4-epoxycyclohexanecarboxylate),
2-ethyl-1,3-hexanediol bis(3,4-epoxycyclohexanecarboxylate),
diethylene glycol bis(3,4-epoxy-6-methylcyclohexanecarboxylate),
3-methyl-1,5-pentanediol bis(3,4-epoxycyclohexanecarboxylate),
3-methyl-1,5-pentanediol bis(3,4-epoxy-2 or 3 or 4 methylcyclohexanecarboxylate),
triethylene glycol bis(3,4-epoxycyclohexanecarboxylate),
1,5-pentanediol bis(3,4-epoxycyclohexanecarboxylate),
2-methoxymethyl-4-dimethyl-1,5-pentanediol bis(3,4-epoxycyclohexanecarboxylate),
ethylene glycol bis(3,4-epoxycyclohexanecarboxylate),
ethylene glycol bis(3,4-epoxy-6-methylcyclohexanecarboxylate), 2-ethylhexane-1,3-diol glutarate 3,4-epoxycyclohexane-
carboxylate),
"Carbowax 400" bis(6-methyl-3,4-epoxycyclohexane-
carboxylate),
"Carbowax 1000" bis(6-methyl-3,4-epoxycyclohexane-
carboxylate),
"Polypropylene glycol 2025" bis(6-methyl-3,4-epoxycyclo-
hexanecarboxylate),
2-ethylhexane-1,3-bis(6-methyl-3,4-epoxycyclohexane-
carboxylate),
2,2'-sulfonyldiethanol bis(3,4-epoxycyclohexane-
carboxylate),
2,2-diethyl-1,3-propanediol bis(3,4-epoxycyclohexane-
carboxylate),
1,6-hexanediol bis(3,4-epoxycyclohexanecarboxylate).

The diol poly(3,4-epoxycyclohexanecarboxylates) above-mentioned can be prepared by epoxidizing the corresponding diol poly(cyclohexanecarboxylate) with at least a stoichiometric quantity of peracetic acid (preferably as a solution in ethyl acetate) per carbon to carbon double bond of said diol poly(cyclohexanecarboxylate), at a temperature in the range of from about 25° to 90° C., for a period of time sufficient to introduce oxirane oxygen at the sites of the carbon to carbon double bonds contained in the diol poly(cyclohexenecarboxylate) reagent. The diol poly(cyclohexenecarboxylates), in turn, can be prepared in accordance with well known condensation techniques, e.g., the esterification of a polyol, e.g., ethylene glycol, diethylene glycol, triethylene glycol, tetraethylene glycol, 1,2-propylene glycol, 1,3-propylene glycol, the polyoxyethylene glycols, 1,4-butanediol, 1,5-pentanediol, 1,6-hexanediol, the octanediols, the octadecanediols, the butenediols, the pentenediols, the hexenediols, the octenediols, and the like; with a 3-cyclohexenecarboxylic acid, e.g., 3-cyclohexenecarboxylic acid, lower alkyl substituted-3-cyclohexenecarboxylic acid, and the like. The expression "lower alkyl," as used in the disclosure, means an alkyl radical which contains from 1 to 4 carbon atoms.

Other diepoxides contemplated include, for instance, the bis(3,4-epoxycyclohexylmethyl) hydrocarbon dicarboxylates and the bis(lower alkyl substituted-3,4-epoxycyclohexylmethyl) hydrocarbon dicarboxylates, e.g., bis(3,4-epoxycyclohexylmethyl) oxalate,
bis(3,4-epoxycyclohexylmethyl) malonate,
bis(3,4-epoxycyclohexylmethyl) succinate,
bis(3,4-epoxycyclohexylmethyl) glutarate,
bis(3,4-epoxycyclohexylmethyl) adipate,
bis(3,4-epoxycyclohexylmethyl) maleate,
bis(3,4-epoxycyclohexylmethyl) tetrahydrophthalate,
bis(3,4-epoxycyclohexylmethyl) citraconate,
bis(3,4-epoxycyclohexylmethyl) isocitraconate,
bis(3,4-epoxy-6-methylcyclohexylmethyl) fumarate,
bis(3,4-epoxycyclohexylmethyl) pimelate,
bis(3,4-epoxycyclohexylmethyl) terephthalate,
bis(3,4-epoxycyclohexylmethyl) azelate,
bis(3,4-epoxycyclohexylmethyl) sebacate,
bis(3,4-epoxycyclohexylmethyl) itaconate,
bis(3,4-epoxycyclohexylmethyl) hexahydrophthalate,
bis(3,4-epoxycyclohexylmethyl) phthalate,
bis(3,4-epoxycyclohexylmethyl) glutaconate,
bis(3,4-epoxycyclohexylmethyl) hydromuconate, and the like, including the bis(3,4-epoxy-6-methylcyclohexylmethyl) hydrocarbon dicarboxylates such as bis(3,4-epoxy-6-methylcyclohexylmethyl) adipate, bis(3,4-epoxy-6-methylcyclohexylmethyl) succinate, and bis(3,4-epoxy-6-methylcyclohexylmethyl) sebacate and the like, as well as di(3,4 - epoxycyclohexylmethyl) - 2 - ethylhexyl-1,2,4-butane tricarboxylate.

Other desirable diepoxides includes the monoesters of 3,4-epoxycyclohexylmethanols and 3,4-epoxycyclohexanecarboxylic acids such as, for example, 3,4-epoxycyclohexylmethyl 3,4-epoxycyclohexanecarboxylate,
1-methyl-3,4-epoxycyclohexylmethyl 1-methyl-3,4-epoxycyclohexanecarboxylate,
6-methyl-3,4-epoxycyclohexylmethyl 6-methyl-3,4-epoxycyclohexanecarboxylate,
2-ethyl-3,4-epoxycyclohexylmethyl 2-ethyl-3,4-epoxycyclohexanecarboxylate,
3,4-epoxy-(3 or 4)-methylcyclohexylmethyl-3,4-epoxy (3 or 4)-methylcyclohexanecarboxylate,
4-n-propyl-3,4-epoxycyclohexylmethyl 4-n-propyl-3,4-epoxycyclohexanecarboxylate,
5-isobutyl-3,4-epoxycyclohexylmethyl 5-isobutyl-3,4-epoxycyclohexanecarboxylate,
9,10-epoxyoctadecyl-6-methyl-3,4-epoxycyclohexanecarboxylate,
lower alkyl substituted-3,4-epoxycyclohexylmethyl lower alkyl substituted-3,4-epoxycyclohexanecarboxylate,
halo substituted-3,4-epoxycyclohexylmethyl halo substituted-3,4-epoxycyclohexanecarboxylate,
1-chloro-3,4-epoxycyclohexylmethyl 1-chloro-3,4-epoxycyclohexanecarboxylate,
2-bromo-3,4-epoxycyclohexylmethyl 2-bromo-3,4-epoxycyclohexanecarboxylate, and the like.

Other diepoxides include ethers wherein the oxirane oxygens are connected in epoxy groups wherein the carbon atoms are a part of a branched or straight chain aliphatic hydrocarbon such as bis(2,3-epoxy-2-ethylhexyl) ether, diglycidyl ether, diglycidyl Cellosolve, bis(2,3-epoxybutyl) ether, bis(2,3-epoxy-2-methylpropoxy) ethane, 2,3-epoxybutyl-2-methylglycidyl ether, di(2-methylglycidyl)carbitol, bis(2-neopentylglycidyl)-ether, glycidyl-(2,3-epoxypropoxy)propionate, bis(2,3 - epoxy - 5,5,7,7-tetramethyloctyl) ether, α,α'-diglycidyloxyparaxylene, bis (glycidyl Cellosolve) maleate, and the like.

Other dieopoxides which can be mentioned include those wherein the two oxirane groups are linked through an aromatic ether i.e. compounds having the grouping

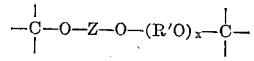

wherein R' is a divalent organic radical, Z is a divalent aromatic radical residuum of a dihydric phenol such as those listed above in the description of dihydric phenols, and x is an integer from 0 to 1 inclusive.

Still other diepoxides include ethers wherein the oxirane groups are connected to vicinal carbon atoms at least one pair of which is apart of a cycloaliphatic hydrocarbon. Among others can be mentioned:

bis(2,3-epoxycyclopentyl)ether,
4(2,3-epoxybutoxy)-9-oxatetracyclo[4.4.1$^{2,4}$.0$^{1,6}$.0$^{8,10}$] undecane,
2,3-epoxycyclopentyl-2-methylglycidyl ether,
1,4-butanediol bis(3,4-epxoycyclohexylmethyl)ether,
1,4-butanediol bis(1-methyl-3,4-epoxycyclohexylmethyl) ether,
1,5-pentanediol bis(6-methyl-3,4-epoxycyclohexylmethyl)ether,
p-xylene-α,α'-bis(6-methyl-3,4-epoxycyclohexylmethyl)ether,
bis(6-methyl-3,4-epoxycyclohexylmethyl)ether,
ethylene glycol bis(3-oxatetracyclo-[4.4.1$^{7,10}$.0$^{1,6}$.0$^{2,4}$] undecyl-8-ether),
bis(3-oxatetracyclo-[4.4.1$^{7,10}$.0$^{1,6}$.0$^{2,4}$]undecyl-8-ether,
3,4-epoxycyclohexylmethyl-6-methyl-3,4-epoxycyclohexylmethyl-ether,
6-oxabicyclo-[3.1.0]hexan-2-yl-9-oxatetracyclo [5.3.1.0$^{2,6}$.0$^{8,10}$]undecan-3-yl ether,
bis[9-oxatetracyclo[5.3.1.0$^{2,6}$.0$^{8,10}$]undecan-3-yl] ether,
bis(3-oxatetracyclo[4.4.0.1$^{7,10}$.0$^{2,4}$]undec-8-yl)-ether;
and the like.

Additional diepoxides include, bis(2,3-epoxy-2-ethylhexyl)adipate, 2,3-epoxy-2-methylpentyl 3,4-epoxycyclohexane carboxylate, bis(2,3-epoxy-2-methylpropyl)succinate, bis(2,3-epoxy-2-ethylhexyl)pimelate, ethylene glycol bis(2,3 - epoxybutyrate), bis(2,3 - epoxy - 2 - ethylexyl) phthalate, 2 - ethyl-1,3-hexanediol-2-ethyl-2,3-epoxyhexyl adipate polyester, bis(2-methyl-2,3-epoxyamyl) pimelate.

Further diepoxides are contemplated, for example, bis (9,10-epoxyoctadecyl) phthalate, diglycidyl maleate, diglycidyl succinate, diglycidyl phthalate, di(2-methylglycidyl) hexahydrophthalate, alkyl diglycidyl-1,2,4-butane tricarboxylate, dipropylene glycol bis(2-ethylhexyl-4,5-epoxycyclohexane-1,2-dicarboxylate), and the like.

Still other desirable epoxides include, by way of illustration, the 3-oxatetracyclo[4.4.0.1$^{7,10}$.0$^{2,4}$]undec-8-yl vicinal-epoxyalkyl ethers.
the 3-oxatetracyclo[4.4.0.1$^{7,10}$.0$^{2,4}$]undec-8-yl vicinal-epoxycycloalkyl ethers,
the 3-oxatetracyclo-[4.4.0.1$^{7,10}$.0$^{2,4}$]undec-8-yl vicinal-epoxycycloalkylalkyl ethers,
the 3-oxatetracyclo[4.4.0.1$^{7,10}$.0$^{2,4}$]undec-8-yl 3-oxatricyclo[3.2.1.0$^{2,4}$]oct-6-yl ethers,
the 3-oxatetracyclo[4.4.0.1$^{7,10}$.0$^{2,4}$]undec-8-yl 3-oxatricyclo[3.2.1.0$^{2,4}$]oct-6-yl alkyl ethers and the like. Specific examples include 3-oxatetracyclo[4.4.0.1$^{7,10}$.0$^{2,4}$]undec-8-yl 2,3-epoxypropyl ether,
3-oxatetracyclo[4.4.0.1$^{7,10}$.0$^{2,4}$]undec-8-yl 3,4-epoxybutyl ether,
3-oxatetracyclo[4.4.0.1$^{7,10}$.0$^{2,4}$]undec-8-yl 2,3-epoxybutyl ether,
3-oxatetracyclo[4.4.0.1$^{7,10}$.0$^{2,4}$]undec-8-yl 3,4-epoxyhexyl ether,
3-oxatetracyclo[4.4.0.1$^{7,10}$.0$^{2,4}$]undec-8-yl 5,6-epoxyhexyl ether,
3-oxatetracyclo[4.4.0.1$^{7,10}$.0$^{2,4}$]undec-8-yl 7,8-epoxyoctyl ether,
3-oxatetracyclo[4.4.0.1$^{7,10}$.0$^{2,4}$]undec-8-yl 2-methyl-2,3-epoxypropyl ether,
3-oxatetracyclo[4.4.0.1$^{7,10}$.0$^{2,4}$]undec-8-yl 2-ethyl-2,3-epoxyhexyl ether,
3-oxatetracyclo[4.4.0.1$^{7,10}$.0$^{2,4}$]undec-8-yl 9,10-epoxystearyl ether,
3-oxatetracyclo[4.4.0.1$^{7,10}$.0$^{2,4}$]undec-8-yl 9,10,12,13-diepoxystearyl ether,
3-oxatetracyclo[4.4.0.1$^{7,10}$.0$^{2,4}$]undec-8-yl 2,3-epoxycyclopenyl ether,
cyclopentyl ether,
cyclopentylmethyl ether,
3-oxatetracyclo[4.4.0.1$^{7,10}$.0$^{2,4}$]undec-8-yl alkyl substituted 3,4-epoxycyclohexyl ether,
3-oxatetracyclo[4.4.0.1$^{7,10}$.0$^{2,4}$]undec-8-yl 3,4-epoxycyclohexyl ether,
3-oxatetracyclo[4.4.0.1$^{7,10}$.0$^{2,4}$]undec-8-yl 2,3-epoxycyclohexyl ether,
3-oxatetracyclo[4.4.0.1$^{7,10}$.0$^{2,4}$]undec-8-yl 2,3-epoxycyclohexylmethyl ether,
3-oxatetracyclo[4.4.0.1$^{7,10}$.0$^{2,4}$]undec-8-yl 6-methyl-3,4-epoxycyclohexylmethyl ether,
3-oxatetracyclo[4.4.0.1$^{7,10}$.0$^{2,4}$]undec-8-yl 5-methyl-3,4-epoxycyclohexylmethyl ether,
3-oxatetracyclo[4.4.0.1$^{7,10}$.0$^{2,4}$]undec-8-yl alkyl substituted 3-oxatricyclo[3.2.1.0$^{2,4}$]oct-6-yl ether,
3-oxatetracylco[4.4.0.1$^{7,10}$.0$^{2,4}$]undec-8-yl 3-oxatricyclo[3.2.1.0$^{2,4}$]oct-6-yl ether, and the like.

Other diepoxides contemplated include, for example, the bis(vicinal-epoxyalkyl) sulfones,
bis(vicinal-epoxyalkylalkoxy) sulfones,
bis(vicinal-epoxycycloalkyl) sulfones,
the bis(vicinal-epoxycycloalkylalkyl) sulfones,
the vicinal-epoxyalkyl 3-oxatetracyclo[4.4.0.1$^{7,10}$.0$^{2,4}$] undec-8-yl sulfones, and the like. Examples of these diepoxy sulfones include
bis(2,3-epoxycyclopentyl) sulfone,
bis(2-ethyl-2,3-epoxycyclopentyl) sulfone,
bis(4-n-butyl-2,3-epoxycyclopentyl) sulfone,
bis(3,4-epoxycyclohexyl) sulfone,
bis(lower alkyl substituted 3,4-epoxycyclohexyl) sulfone,
bis(2-methyl-3,4-epoxycyclohexyl) sulfone,
bis(5-isopropyl-3,4-epoxycyclohexyl) sulfone,
bis(3,4-epoxycycloheptyl) sulfone,
bis(lower alkyl substituted 3,4-epoxycycloheptyl) sulfone,
bis(2,3-epoxycyclopentylalkyl) sulfone,
bis(2,3-epoxycyclopentylmethyl) sulfone,
bis(2,3-epoxycyclopentylpropyl) sulfone,
bis(3,4-epoxycyclohexylakyl) sulfone,
bis(3,4-epoxycyclohexylmethyl) sulfone,
bis(3,4-epoxycyclohexylbutyl) sulfone,
bis(3,4-epoxycycloheptylalkyl) sulfone,
bis(3,4-epoxycycloheptylmethyl) sulfone,
bis(3-oxatricyclo[3.2.1.0$^{2,4}$]oct-6-yl) sulfone,
bis(3-oxatetracyclo[4.4.0.1$^{7,10}$.0$^{2,4}$]undec-8-yl) sulfone,
2,3-epoxypropyl 2,3-epoxycyclopentyl sulfone,
2-methyl-2,3-epoxypropyl 2,3-epoxycyclopentylmethyl sulfone,
10,11-epoxyoctadecyl 3,4-epoxycyclohexyl sulfone,
2-methyl-2,3-epoxyhexyl 3-oxatricyclo[3.2.1.0$^{2,4}$]oct-6-yl sulfone,
2,3-epoxycyclopentyl 3-oxatetracyclo[4.4.0.1$^{7,10}$.0$^{2,4}$] undec-8-yl sulfone,
2-methyl-3,4-epoxycyclohexyl 2,3-epoxycyclopentylethyl sulfone,
3,4-epoxypentyl 2-n-butyl-3,4-epoxycyclohexyl sulfone, and the like.

Still other diepoxides contemplated include, for example, bis(vicinal-epoxyhexoxyalkyl) sulfone,
bis(lower alkyl substituted-vicinal-epoxyhexoxyalkyl) sulfone,
bis(vicinal-epoxycyclohexoxyalkyl) sulfone,
bis(lower alkyl substituted-vicinal-epoxycyclohexoxyalkyl sulfone,
bis(vicinal-epoxycyclohexylalkoxyalkyl) sulfone,
bis(lower alkyl substituted-3-oxatricyclo[3.2.1.0$^{2,4}$]-6-octoxyalkyl) sulfone,
bis(3-oxatetracyclo[4.4.0.1$^{7,10}$.0$^{2,4}$]-8-undecoxyalkyl) sulfone,
vicinal-epoxyalkoxyalkyl 3-oxatricyclo[3.2.1$^{2,4}$]-6-octoxyalkyl sulfone,
vicinal-epoxycyclohexoxyalkyl 3-oxatetracyclo[4.4.0.1$^{7,10}$.0$^{2,4}$]-8-undecoxyalkyl sulfone, and the like. Specific examples of the preceding diepoxy diether sulfones include, among others, bis(3,4-epoxyhexoxypropyl) sulfone,
bis(2,5-dimethyl-3,4-epoxyhexoxypropyl) sulfone,
bis(3,4-epoxycyclohexoxypropyl) sulfone,
bis(2-methyl-3,4-epoxycyclohexoxyethyl) sulfone,
bis(2,5-dimethyl-3,4-epoxycyclohexoxypropyl) sulfone,
bis 2,3-epoxycyclohexylmethoxyethyl) sulfone,
bis(3,4-epoxycyclohexylethoxypropyl) sulfone,
bis(lower alkyl substituted-3,4-epoxycyclohexylmethoxypropyl) sulfone,
bis(3-oxatricyclo[3.2.1.0$^{2,4}$]-p-octoxyethyl) sulfone,
bis(3-oxatetracyclo[4.4.0.1$^{7,10}$.0$^{2,4}$]-8-undecoxypropyl) sulfone,
2,3-epoxypropoxyethyl 3-oxatricyclo[3.2.1.0$^{2,4}$]-6-octoxypropyl sulfone,
2-ethyl-2,3-epoxyhexoypropyl 3,4-epoxycyclohexoxyethyl sulfone,
9,10-epoxyoctadecoxypropyl 2-methyl-3,4-epoxycyclohexoxyethyl sulfone,
bis(ethyl substituted-3-oxatetracyclo[4.4.0.1$^{7,10}$.0$^{2,4}$]-8-undecoxyethyl) sulfone,
bis(dimethyl substituted-3-oxatetracyclo[4.4.0.1$^{7,10}$.0$^{2,4}$]-8-undecoxyethyl) sulfone,
bis(lower alkyl substituted-3-oxatetracyclo-[4.4.0.1$^{7,10}$.0$^{2,4}$]-8-undecoxyethyl) sulfone, and the like.

Additional diepoxides contemplated include, for example, omega,omega'-sulfonyldialkyl bis(vicinal epoxycycloalkanecarboxylate),
omega,omega'-sulfonyldialkyl bis(vicinal-epoxycycloalkylalkanoate),
omega,omega'-sulfonyldialkyl bis(3-oxatricyclo[3.2.1.0$^{2,4}$]octane-6-carboxylate), and the like. Illustrative examples of the above-mentioned diepoxy diester sulfones are 2,2'-sulfonyldiethyl bis (2,3-epoxycyclopentanecarboxylate),
4,4'-sulfonyldibutyl bis(3,4-epoxycyclohexanecarboxylate),
3,3'-sulfonyldipropyl bis(3,4-epoxycycloheptanecarboxylate),
2,2'-sulfonyldiethyl bis(3,4-epoxycyclopentylacetate),
4,4'-sulfonyldibutyl bis(2,3-epoxycyclopentylpropionate),
2,2-sulfonyldiethyl bis(3-oxatricyclo[3.2.1.0$^{2,4}$]octane-6-carboxylate), and the like.

Still other diepoxides contemplated include, for example, the 3-oxatetracyclo[4.4.0.1$^{7,10}$.0$^{2,4}$]undec-8-yl vicinal-epoxyalkanoates,
the 3-oxatetracyclo[4.4.0.1$^{7,10}$.0$^{2,4}$]undec-8-yl vicinal epoxycycloalkanecarboxylates,
the 3-oxatetracyclo[4.4.0.1$^{7,10}$.0$^{2,4}$]undec-8-yl vicinal-epoxycycloalkylalkanoates,
the 3-oxatetracyclo[4.4.0.1$^{7,10}$.0$^{2,4}$]undec-8-yl 3-oxatricyclo[3.2.1.0$^{2,4}$]octyl-6-alkanoates, and the like. Specific examples include 3-oxatetracyclo[4.4.0.1$^{7,10}$.0$^{2,4}$]undec-8-yl 2,3-epoxypropionate,
3-oxatetracyclo[4.4.0.1$^{7,10}$.0$^{2,4}$]undec-8-yl 2,3-epoxybutyrate,
3-oxatetracyclo[4.4.0.1$^{7,10}$.0$^{2,4}$]undec-8-yl 9,10-epoxystearate,
3-oxatetracyclo[4.4.0.1$^{7,10}$.0$^{2,4}$]undec-8-yl 9,10,12,13-diepoxystearate,
3-oxatetracyclo[4.4.0.1$^{7,10}$.0$^{2,4}$]undec-8-yl 2,3-epoxycyclopentanecarboxylate,
3-oxatetracyclo[4.4.0.1$^{7,10}$.0$^{2,4}$]undec-8-yl 3,4-epoxycyclopentanecarboxylate,
3-oxatetracyclo[4.4.0.1$^{7,10}$.0$^{2,4}$]undec-8-yl 4-methyl-2,3-epoxycyclopentanecarboxylate,
3-oxatetracyclo[4.4.0.1$^{7,10}$.0$^{2,4}$]undec-8-yl 2-methyl-3,4-epoxycyclohexanecarboxylate,
3-oxatetracyclo[4.4.0.1$^{7,10}$.0$^{2,4}$]undec-8-yl 3-oxatricyclo[3.2.1.0$^{2,4}$]octane-6-carboxylate,
3-oxatetracyclo[4.4.0.1$^{7,10}$.0$^{2,4}$]undec-8-yl 3-oxatricyclo[3.2.1.0$^{2,4}$]octyl-6-acetate,
3-oxatricyclo[3.2.1.1$^{1,5}$.0$^{2,4}$]octyl-6-methyl-3-oxatricyclo[3.2.1.1$^{1,5}$.0$^{2,4}$]octane-6-carboxylate,
tetraethylene glycol bis(3-oxatricyclo[3.2.1.0$^{2,4}$]octane-6-carboxylate,
ethylene glycol bis(3-oxatricyclo[3.2.1.0$^{2,4}$]octyl-6-methyl maleate,
ethyl bis(3-oxatricyclo[3.2.1.0$^{2,4}$]octyl-6-methyl-1,2,4-pentadiene dioxide,
dipentene dioxide 1,2-5,6-diepoxycyclooctane,
butadiene dioxide,
divinyl benzene dioxide,
4,10-dioxatetracyclo[5.4.0$^{3,5}$.0$^{1,7}$.0$^{9,11}$]undecane,
bis-2,3-epoxycyclopentyl 4,8-dioxatricyclo[5.1.0.0$^{3,5}$]octane,
1,2,4,5-diepoxycyclohexane,
1,2,3,4,5,8-hexahydro-6,7,9,10-diepoxynaphthalene,
6-epoxyethyl-3-oxatricyclo[3.2.1.0$^{2,4}$]octane, and the like.

The diepoxy diester sulfones can be prepared by the reaction of, for example, omega,omega'-thioalkanol bis(cycloalkenecarboxylate), omega,omega'-thioalkanol bis(bicycloalkenylcarboxylate), and the like, with at least four mols of peracetic acid per mol of sulfide reagent. In this reaction, the sulfide moiety, i.e., —S—, is oxidized to the sulfonyl group, i.e., —SO$_2$—, and oxirane oxygen is introduced at the site of both carbon to carbon double bonds of the sulfide reagent. The omega,omega'-thiodialkanol di(unsaturated esters), in turn, can be prepared by the diesterification of stoichiometric quantities of a thiodialkanol, e.g., thiodiglycol, 3,3'-thiodipropanol, 8,8'-thiodioctanol, and the like, with an unsaturated organic acid, e.g., 3-cyclohexenecarboxylic acid, bicyclo[2.2.1]-5-heptene-2-carboxylic acid, and the like, in toluene or other appropriate inert organic media, using a sulfuric acid catalyst, and heating under reflux until the water formed by the reaction is completely removed as the lower layer of the distillate. The catalyst is then neutralized with an excess of sodium acetate, and after filtration, the esterification product is distilled, recovering the corresponding omega,omega'-thiodialkanol di(unsaturated ester).

Further contemplated diepoxides include diglycidyl acetate,
4-(3,4-epoxy-6-methylcyclohexylmethyl)-3,5,8-trioxabicyclo[5.1.0]octane,
3-(epoxyethyl)-spiro[5.5]-2,4-dioxa-9,10-epoxyundecane,
4-(3,4-epoxybutyl)-3,5,8-trioxabicyclo[5.1.0]octane,
4-pentenal-di-(6-methyl-3,4-epoxycyclohexylmethyl)acetal,
2-propyl-4,5-di-(1-methyl-1,2-epoxyethyl)-1,3-dioxolane,
4-(6'-tricyclo[3.2.1$^{1,5}$.0$^{2,4}$]-3'-oxatricyclo)-3,5,8-trioxabicyclo[5.1.0]octane,
bis(6-methyl-3,4-epoxycyclohexylmethyl)formal,
bis(3,4-epoxycyclohexylmethyl)formal and the like.

Still other suitable diepoxides are epoxidized stearates such as, for instance:

ethylene glycol bis(9,10-epoxystearate),
2-ethyl-2,3-epoxyhexyl-9,10-epoxystearate,
2-ethyl-1,3-hexanediol bis(9,10-epoxystearate),
3,4-epoxy-6-methylcyclohexylmethyl-9,10-epoxystearate,
2-ethylhexyl mono- and di-epoxystearates from Aliphat 44-A or from Neo-Fat 3-R,
alkyl 9,10,12,13-diepoxystearate,
3-methyl-1,5-pentanediol bis(9,10-epoxystearate),
2-ethyl-1,5-pentanediol bis(9,10-epoxystearate),
9,10-epoxystearyl-9,10-epoxystearate,
propylene-1,3-bis(3,4-epoxybutanoate),
2-ethylhexane-1,3-bis(3,4-epoxybutanoate),
4,5-epoxypentyl-4,5-epoxypentanoate,
epoxidized 3-methyl-1,5-pentanediol adipate-4-pentenoate,
ethyl 2,3-4,5-diepoxyhexanoate,
methyl 2,3-4,5-diepoxyhexanoate,
2,3-4,5-diepoxyhexanoic acid,
1,5-pentanediol-bis(5,6-epoxy-3,3,5-trimethylhexanoate),
1,5-pentanediol bis(2,3-epoxy-2-ethylhexanoate),
3,4-epoxy-6-methylcyclohexylmethyl-2,3-epoxy-2-ethylhexanoate.

Still other diepoxides include bis(2,3-epoxybutylphenyl)-2-ethylhexyl phosphate, diethyl bis(2,3-epoxypropoxy) silane, epoxide ester of soybean oil alcohols, alkyl ester of epoxidized safflower oil fatty acids, alkyl ester of epoxidized tall oil fatty acids, nonylphenyl epoxytallate, 1,2,5,6 - diepoxy - 2,5 - dimethylhexane-3,4-diol, 3-methyl-1,5-adiamide grouping; or a divalent group containing a structure composed of carbon and oxygen such as a carbonate grouping; or a divalent inorganic group containing a structure composed of oxygen and a non-metal such as a phosphate or a sulfone group, or a silane group;

$R_2$, $R_3$, $R_6$ and $R_7$ can be hydrogen, a monovalent organic group, such as an alkyl group e.g. a methyl, ethyl or propyl group, or a monovalent organic group such as an ester containing group or an acid containing group or a divalent organic group such as an alkylene, alkylidene or cycloalkylene group or a divalent ester containing group; and $R_4$ and $R_5$ can be hydrogen or a monovalent or divalent group e.g. alkyl such as methyl, ethyl, and neopentyl or aryl such as phenyl or alkylene, alkylidene or arylene.

The preferred diepoxides are those wherein each of the oxirane groups is connected to an electron donating substituent which is not immediately connected to the carbon atoms of that oxirane group. These diepoxides have both of the oxirane groups corresponding to the formula

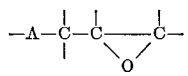

wherein A is an electron donating substituent such as

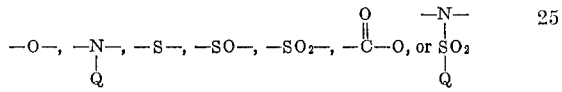

and Q is a saturated hydrocarbon radical, is saturated as defined above, e.g. an alkyl, cycloalkyl, aryl or aralkyl group.

Among suitable epihalohydrins and mixtures thereof which with epoxides can be reacted with dihydric phenols to produce the thermoplastic polyhydroxyethers of this invention are those having the general formula:

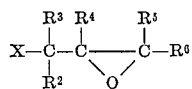

wherein $R^2$, $R^3$, $R^4$, $R^5$, and $R^6$ which can be the same or different are hydrogen or organic radicals such as alkyl, cycloalkyl, aryl, alkylene and arylene and X is a halogen atom, i.e., chlorine, bromine, and the like. Specific epihalohydrins are epichlorohydrin, epibromohydrin, 1,2-epoxy-1-methyl-3-chloropropane and 1,2-epoxy-2-methyl-3-chloropropane.

Illustrative of structural elements which can be prepared from the foregoing dihydric polynuclear phenols are aluminum laminates.

EXAMPLE 107

A laminate was prepared using aluminum strips which had been cleaned and preheated by immersion for 10 minutes in phosphoric acid, 800 cc. n-butyl alcohol, 600 cc. isopropyl alcohol and 400 cc. distilled water mixture. The "phosphated" strips 1" x 4" x 0.064" were washed in a continuous flow water bath for 10 minutes and then air dried and wrapped in polyethylene until used.

The polyhydroxyether used was prepared as in Example 1 and was the reaction product of approximately equimolar amounts of epichlorohydrin and 1,3-bis(4-hydroxyphenyl)-1-ethylcyclohexane.

A film of this polyhydroxyether having thickness of 9–12 mils was placed between two of the above prepared aluminum strips. The assembly was placed in a laminating press and heated at 600° F. for 20 seconds, and then removed to a cooling press set at 380–390° F. Average shear strength for 5 laminates measured according to ASTM D1002 was 2830 p.s.i.

EXAMPLE 108

Example 107 was duplicated but using a polyhydroxyether prepared by the method of Example 1 from approximately equimolar amounts of epichlorohydrin and the bisphenol of acetophenone. Average lap shear strength for five laminates was 1740 p.s.i.

EXAMPLE 109

Example 107 was duplicated but using the polyhydroxyether of 2,2-bis(4-hydroxyphenyl)propane and bis(2,3-epoxycyclopentyl)ether. Average lap shear strength for five laminates is 2165 p.s.i.

EXAMPLE 110

Example 107 was duplicated but using a polyhydroxyether prepared from 2,2-bis(3,5-dichloro-4-hydroxyphenyl)propane and epichlorohydrin. Average lap shear strength for five laminates was 2010 p.s.i.

EXAMPLE 111

Example 107 is duplicated but using a 50/50 blend of the polyhydroxyethers of Examples 107 and 109. Average lap shear strength for five laminates is 2690 p.s.i.

EXAMPLE 112

Example 107 was duplicated but using a polyhydroxyether prepared by the method of Example 1 from approximately equimolar amounts of dihydroxy diphenyl sulfone and epichlorohydrin. Bonding was at 700° F. for 40 seconds. Average lap shear strength was 1760 p.s.i.

EXAMPLE 113

Example 107 is duplicated but using a polyhydroxyether prepared by the method of Example 1 from approximately equimolar amounts of 1,2-epoxy-1-methyl-3-chloropropane and 2,4-bis(4-hydroxyphenyl)-4-(methylpentane).

Good bond strength is obtained.

EXAMPLE 114

Example 107 is duplicated but using a polyhydroxyether prepared by the method of Example 1 from approximately equimolar amounts of 1,2-epoxy-1-methyl-3-chloropropane and 2,4-bis(4-hydroxyphenyl)-4-(methylpentane).

Good bond strength is obtained.

EXAMPLE 115

Example 107 is followed but bonding at 700° F. for 40 seconds a polyhydroxyether prepared as in Example 1 from approximately equimolar amounts of epichlorohydrin and the bisphenol reaction product of two moles of phenol and one mole of dipentene or its isomers e.g. α-pinene, limonene, et cetera.

Bond strength at 25° C. per ASTM D1002 was 3800 p.s.i.

The thermoplastic polyhydroxyethers used in this invention can be further modified by being reacted with a variety of crosslinking agents such as, among others organic isocyanates e.g. toluene diisocyanates, dianisidine diisocyanates, polyethylene polyisocyanate, toluene diisocyanate terminated polybutylene glycol, and phenol blocked polyisocyanate and the like; methylol containing compounds, e.g. 2,4,6-trimethylolphenol, polymethylolated bisphenol sulfone, dimethylol-p-tert-butylphenol, dimethylol - p - methylphenol, butylphenol - formaldehyde resin, nonylphenol formaldehyde resin, butylated melamine-formaldehyde resin and the like; epoxy compounds e.g. the diglycidyl ether of 2,2-bis(4-hydroxyphenyl)-propane, 2,4-epoxy-6-methylcyclohexylmethyl-3,4-epoxy-6-methylcyclohexanecarboxylate and the like; aldehydes e.g. glyoxal, dialdehyde starch, formaldehyde copolymers and the like; formals e.g. dibutyl formal, di-(2-chloromethyl) formal and the like; dicarboxylic acid anhydrides, e.g. maleic anhydrides, phthalic anhydride and the like; acids e.g. glutaric acid, sebacic acid, isophthalic acid, phosphoric acid; chloroformates, e.g. diglycol chloroformate of 2,2-bis(4-hydroxyphenyl)propane and the like; silanes e.g. ethyltrichlorosilane, diphenyl dichlorosilane, tetraethyl ortho silicate and the like; metal organic salts e.g.

tetrabutyl titanate, aluminum acetyl acetonate, zinc acetyl acetonate, zirconium acetyl acetonate and the like; ureas e.g. dimethyl ether of dimethylol urea; inorganic esters e.g. dimethyl sulfate; acyl chlorides, e.g. succinyl chlorides and the like; inorganic polychlorides e.g. zinc chloride, aluminum trichloride and the like; esters e.g. glycol diformate, glycol dipropionate triglycol di-(2-ethyl hexanoate) and the like; as well as trichloroacetaldehyde glyoxalic acid, and epichlorohydrin and similar compounds having mixed functional groups.

The thermoplastic polyhydroxyethers are cross linkable with the above and similar polyfunctional reagents by any of a variety of means providing intimate contact of the crosslinking agent and the thermoplastic polyhydroxyether, for example the thermoplastic polyhydroxyether and crosslinking agent can be codissolved in a mutual solvent or melted together on a two roll mill, or fluxed together in a compounding extruder or similar apparatus such as a Banbury mixer.

EXAMPLES 116–117

A polyhydroxyether prepared as in Example 1 from 2,2-bis(4-hydroxyphenyl)propane and epichlorohydrin was dissolved in sufficient tetrahydrofuran to make a 25% solution. There was added to portions of the solution 2 parts of toluene diisocyanate (Example 116) and 4 parts of the toluene diisocyanate (Example 117) per 100 parts of the polyhydroxyether. The solutions were applied to cold rolled steel panels which were baked at 150° C. for 15 minutes. Adhesion to the steel was excellent in both instances. No delamination occurred when the panels were subjected to 160 inch pound bumps on the Gardner impact tester.

Also useful in this invention are thermoplastic polyhydroxyethers modified without crosslinking by esterification with an acyl group obtained from any one of a variety of acylating agents containing but one secondary hydroxyl reactive group e.g. organic acids, inorganic acids and acid derivatives such as acid halides and anhydrides having the general formula GZ wherein G is an inorganic or organic acid radical such as acetyl, benzoyl, stearyl, formyl, propionyl, chloroacetyl, o-chlorobenzyl, p-toluenesulfonyl, mercaptoacetyl, diphenylphosphinyl, nitrate and like groups and Z is (a) halogen i.e. fluorine, chlorine, bromine, and iodine where the acylating agent is an acid halide; (b) a G' group, G' being a radical as listed above and free of any substituents reactive with secondary hydroxyl groups where the acylating agent is an acid anhydride; (c) an OH group where the acylating agent is an acid, either inorganic or organic; and a G'' group where G'' is any hydrocarbon group free of aliphatic unsaturation such as alkyl, cycloalkyl, aryl or aralkyl groups or a substituted hydrocarbon group free of substituents reactive with secondary hydroxyl groups where the acylating agent is an acid ester. Other acylating agents include hexachloro-2-cyclopentenone, soya fatty acids and tall oil acids.

EXAMPLE 118

Example 107 was duplicated but using as the polyhydroxyether an esterified resin prepared by dissolving 50 grams (0.176 mole OH) of a polyhydroxyether of 2,2-bis (4-hydroxyphenyl)propane and epichlorohydrin and 31.6 grams of pyridine in 500 milliliters of dioxane in a one liter 3-necked flask equipped with mechanical stirrer, thermometer, and reflux condenser and dropping funnel. There was gradually added to the flask over a 32 minute period 29.8 grams of chloroacetyl chloride. An exothermic reaction (25 to 43° C.) ensued. The mixture was refluxed for 1.5 hours after addition was complete. The chloroacylated polymer was recovered by coagulation in isopropanol washed with isopropanol, HCl and water and dried for 16 hours in a vacuum oven at 50–60° C. and 10–20 mm. Hg.

Average lap shear strength for five laminates was 2080 p.s.i.

EXAMPLE 119

Example 118 was duplicated but using as the acylating agent for the polyhydroxyether acetyl chloride.

Average lap shear strength for five laminates was 1610 p.s.i.

EXAMPLE 120

Example 119 is duplicated but using as the acylating agent for the polyhydroxyether stearyl chloride. Lap shear strength is good.

EXAMPLE 121

Example 118 was duplicated but using as the acylating agent for the polyhydroxyether benzoyl chloride. Average lap shear strength for five laminates was 2440 p.s.i.

EXAMPLE 122

The formyl ester of the polyhydroxyether of 2,2-bis-(4-hydroxyphenyl)propane and epichlorohydrin was prepared by dissolving 25 grams (0.088 mole OH) of the polyhydroxyether and 0.5 gram (0.021) of lithium hydroxide catalyst in 250 milliliters of dioxane in a flask like that used in Example 118 and equipped with a 20 centimeter Vigreaux distillation column with a fractionating head. To the solution there was added 22.5 grams (0.443 mole) of 90.6% formic acid in water. The reaction mixture was distilled until the head temperature reached 100° C. Recovery, washing and testing were as in Example 118.

Average lap shear strength for five laminates was 3010 p.s.i.

EXAMPLE 123

The acetyl ester of the polyhydroxyether of 2,2-bis-(4-hydroxyphenyl)propane and epichlorohydrin was prepared by dissolving 50 grams (0.176 mole OH) of the polyhydroxyether in 327 grams (4.1 moles) of pyridine in the equipment of Example 118. To this solution there was added 181 grams (1.8 moles) of acetic anhydride. The mixture was heated 4 hours on a steam bath (85° C.) with stirring. Recovery, washing and testing were as in Example 118.

Average lap shear strength for five laminates was 1950.

Thermoplastic polyhydroxyethers containing flame retardants can also be used in the structural elements of the present invention wherever resistance to combustion is a desirable attribute. Typical flame retardant mixtures comprise 100 parts by weight of the thermoplastic polyhydroxyether and 5 to 40 parts by weight of a mixture of an organic chlorine or bromine containing compound and a halogen carrier such as a metal oxide or sulfide. Among the organic halogen containing compounds, those deserving of special mention are the halogenated polyphenyls i.e. chlorine or bromine substituted monomeric ring containing compounds, e.g. chlorinated or brominated biphenyls, terphenyls and tetraphenyls and higher polyphenyls. Chlorinated paraffin waxes can also be used. Chlorinated and brominated polyhydroxyethers prepared from halogenated dihydric phenols or halogenated after polymerization can also be used. Among the metal oxides and sulfides, those deserving of special mention are the oxides and sulfides of antimony, arsenic and bismuth i.e. metals of the VB group of the Deming periodic table (Handbook of Chemistry and Physics, Chemical Rubber Publishing Co., 35th ed., p. 389). The flame retarded polyhydroxyethers can also contain a minor amount of a natural or synthetic rubber.

Examples are given above of the use of thermoplastic polyhydroxyether to surface wood and metallic substrates. Other materials can also be advantageously surfaced with polyhydroxyether, especially where the substrate is porous and is likely to be exposed to dampness and water.

EXAMPLE 124

A 4" x 8" x 2" cinder block is surface coated with a laminate of a 0.060 inch thick sheet of a polyhydroxyether and lead foil by holding the laminate against the block at nominal pressures and heating until a glue line temperature of 375° F. is achieved. Attempts to remove the laminate result in delamination of the cinder block.

EXAMPLE 125

Example 124 is duplicated but substituting plywood for the lead foil. This laminate is then bonded to a cinder block using the polyhydroxyether as the adhesive.

EXAMPLE 126

A 4" x 8" x 2" cinder block was surface coated with a 0.060 inch thick sheet of a polyhydroxyether of 2,2-bis-(4-hydroxyphenyl)propane and epichlorohydrin prepared as in Example 1 and having a melt flow of 5.0. The film was laid on the cinder block face and held there-against with nominal pressure at 375° F. for one minute. The resin flowed into the interstices of the cinder block, but remained exteriorly smooth. Attempts to remove the film resulted in delamination of the cinder block.

EXAMPLE 127

Example 126 is dupulicated but using a standard brick in place of the cinder block. Again adhesion is excellent.

The film thus used to surface construction materials can be fabricated of pigmented or otherwise decoratively treated polyhydroxyether, or the films themselves can be treated to give a striking appearance to the coated material.

Fibrous bonded mats and like construction can also be surfaced with thermoplastic polyhydroxyether to improve water resistance and appearance.

EXAMPLE 128

Sisal fibers were coated with a phenolic resin prepared by mixing 50 parts by weight of a novolac resin and 50 parts by weight of a phenolic 1-step resin having 2.5 moles of methanol per phenolic nuclei. The fibers were shaped into a mat (30% linear sisal mat and 70% phenolic resin) and a one mil film of a polyhydroxyether of 2,2-bis(4-hydroxyphenyl)propane and epichlorohydrin prepared as in Example 1 and having a melt flow of 5.0 was laid on the surface of the uncured mat. The composite was placed in a laminating press at 300° F. and at 100 p.s.i. for 3 minutes and then cooled. The effect was the simultaneous curing of the phenolic resin binder and bonding of the polyhydroxyether film to the mat surface. The resultant film surfaced plaque could not be delaminated and had a glossy appearance on the film coated side.

EXAMPLE 129

Glass cloth was laminated using a film of thermoplastic polyhydroxyether.

Squares of glass cloth treated with methacrylic chromium chloride were stacked with squares of thermoplastic polyhydroxyether film cut to the same size. The distribution of the thermoplastic film was random in that the film was not interleaved between each pair of glass cloth squares and many sheets of film were stacked adjacent one another. In all, 34 sheets of a one-mil film of the polyhydroxyether of 2,2-bis(4-hydroxyphenyl) propane and epichlorohydrin prepared as in Example 1 and having a melt flow of 13 were stacked with 9 plies of glass cloth. The assembly was placed in a laminating press heated to 350° F. The assembly was held at nominal pressure for 10 minutes to heat the laminae. Pressure on the laminae was then increased to 667 p.s.i. and held there for 20 minutes. The assembly was then cooled, while still under pressure. The laminate was 1/16" thick and had a translucent greenish appearance characteristic of good fiber wetting.

EXAMPLE 130

Example 129 was duplicated but using 17 glass cloth laminae and 24 2.5 mil thick laminae of thermoplastic polyhydroxyether having a melt flow of 2. A 1/8" thick laminate was obtained. Surprisingly no air was trapped in the laminate despite the extensive interleaving.

EXAMPLES 131–132

A synthetic fiber of poly(vinyl chloride/acrylonitrile) woven into a cloth was laminated to a sheet of thermoplastic polyhydroxyether. The sheet was 20 mils (Example 131) or 40 mils (Example 132) thick. Bonding to one or both sides of the sheet was accomplished by holding the synthetic fiber cloth against the sheet at nominal pressures in a laminating press heated to 284° F. for four minutes and then cooling in the press.

The laminates obtained in these examples were postformable e.g. by peripherally securing, heating and stretching at the center. The resultant structural element has in combination the attractiveness and wear resistance of the synthetic fiber and the rigidity of the thermoplastic polyhydroxyether.

Other surface treatments with polyhydroxyether include finishing wood surfaces using a polyhydroxyether lacquer.

EXAMPLE 133

A 10–15 percent solution of polyhydroxyether in a mixture of methyl ethyl ketone and diethylene glycol monoethyl ether acetate is sprayed on wood furniture surface. The solvent is evaporated. A glossy hard surface is obtained.

Films can also be used to protect and seal wood surfaces as illustrated in previous examples.

In surfacing wood especially lower grades of wood with lacquers or films the roughness of the surface appears on the coating. This is the so-called fiber telegraph. A means of preventing fiber telegraph is illustrated in

EXAMPLE 134

Finely ground wood flour was mixed into a solution of polyhydroxyether in tetrahydrofuran and pressed into a molded panel under heat to evaporate the solvent. The panel was then laminated to metal foil coated on both sides with polyhydroxyether. This foil/wood flour laminate was then laminated to inexpensive, rough surfaced plywood. A smooth surfaced wood product was obtained. If desired the metal foil can be omitted and only a film of polyhydroxyether used.

Honeycomb structure such as are obtained from epoxy, polyurethane, and polystyrene foams and fiber glass mats can be surfaced with film or sheet of polyhydroxyethers used alone or laminated to another material.

Other surface disadvantages can be overcome through the use of an interlayer of polyhydroxyether e.g. in an epoxy resin/copper laminate for printed circuits and the like. The polyhydroxyether acts as a barrier to the interference of the copper with the epoxy curing reaction.

An example of the bonding together of fibrous or stranded materials is "whipping" ends of rope or cable by wrapping polyhydroxyether therearound and melting the polymer between and around the strands; or a solution can be used.

Polyhydroxyether can be used to provide surfaces for discrete materials.

EXAMPLE 135

Glass beads of the size and type used in reflector strips are heated to 400° F. and deposited on a strip of $TiO_2$ pigmented polyhydroxyether film. The film is applied to a preheated roadway and bonded thereto. A reflective marker is thus obtained.

The above technique of embedding glass particles is also adaptable to production of movie screens from glass beads and polyhydroxyether film or sheet.

The above example is an instance of providing a convenient substrate for discrete materials. This concept can be extended to embrace mounting of particles, pieces or panels of brittle materials on a sheet of polyhydroxyether. Materials which can be handled this way include silica and tungsten carbide.

EXAMPLE 136

Bonding of rubber to steel was accomplished with thermoplastic polyhydroxyether.

A butadiene/acrylonitrile rubber was bonded to steel coated with thermoplastic polyhydroxyether. The steel was stainless Type 302 which had been pretreated by immersion for 20 minutes in Wyandotte WLG alkaline solution at 160° F., rinsing in water one minute, immersion in oxalic acid/sulfonic acid/water mixture for 10 minutes, rinsing again and force drying.

A polyhydroxyether of 2,2-bis(4-hydroxyphenyl)propane and epichlorohydrin prepared as in Example 1 and having a melt flow of 31 was placed on the cleaned steel by molding pellets of the resin against the steel at 700° F. for 20 seconds, and then cooling under moderate pressures. The rubber was bonded to the steel by pressing the rubber against the coating for 8 minutes with full steam on the press and at moderate pressures. Attempts to strip off the rubber resulted in rubber failure.

Concrete, including concrete roadways, can be similarly surfaced with polyhydroxyethers as a moisture barrier and an adhesive for abrasive grit.

EXAMPLE 137

A sheet of thermoplastic polyhydroxyethers of 2,2-bis(4-hydroxyphenyl)propane and epichlorohydrin was applied to a concrete surface by heating the concrete to 300–600° F. with a hot air blower, immediately applying the plastic sheet, heating the plastic sheet in contact with the concrete with the hot air blower and then pressing the plastic with a roller. Good adhesion was obtained.

The above composition offers the advantages of a thermoplastic resin over a thermosetting resin. Particularly the composition offers the advantage of possible immediate use of the roadway. The cure period required for epoxy compositions is obviated.

As mentioned above, thermoplastic polyhydroxyethers are useful as matrices for various materials, and in particular can be used to hold abrasive grains at a surface to give non-skid attributes.

EXAMPLES 138–139

Sheeting 20 mil thick (Example 138) and 125 mil thick (Example 139) of the polyhydroxyether of 2,2-bis-(4-hydroxyphenyl) propane and epichlorohydrin prepared as in Example 1 were used. Particles of aluminum oxide were heated in an oven to 600–700° F. and then poured onto the polyhydroxyether sheeting. Most of the particles were well embedded in the resin; the excess was poured off. Adhesion was so good the sheeting could be used to abrade metal without removing more than a negligible fraction of the abrasive.

Other particles can similarly be embedded e.g. emery, graphite, and aluminum metal particles. Particles of various degrees of coarseness have been successfully applied. Pressing the particles into the resin improved adhesion.

Polyhydroxyether film can be embedded in reticulate materials to give rigidity thereto and to produce novel decorative and strength effects.

EXAMPLE 140

Example 139 is duplicated but substituting crushed slate for the aluminum oxide particles. The resulting surface is useful as a blackboard. The polyhydroxyether can be a thinner sheet bonded to some strong substance.

EXAMPLE 141

A powder of polyhydroxyether was placed on a mat of rayon fibers and the blend was pressed and heated to 300° C. A non-woven fabric was obtained.

EXAMPLE 142

Example 141 was duplicated but using cotton fibers. A non-woven fabric was obtained.

EXAMPLE 143

Two sections of bone were bonded together with a 5 mil film of polyhydroxyether by heating the assembly until a glue line temperature of 350° F. was achieved. The bone sections were inseparable, suggesting surgical repair can be accomplished with polyhydroxyether.

EXAMPLE 144

A polyhydroxyether of 2,2-bis(4-hydroxyphenyl)propane and epichlorohydrin prepared as in Example 1 and having a melt flow of 3.0 in the form of a 10 mil film was laid on a glass cloth (Ferro–900) and laminated thereto at 365° F. and 166 p.s.i. for one minute. The bond obtained was excellent.

EXAMPLE 145

A polyhydroxyether of 2,2-bis(4-hydroxyphenyl)propane and epichlorohydrin prepared as in Example 1 and having a melt flow of 3.0 was used as the adhesive interlayer in a novel decorative laminate. The laminate was prepared by laying a 3 mil film of the polyhydroxyether on a ¼ inch thick plywood and placing a layer of ordinary burlap on the film. The assembly was placed in a press at 375° F. and 160 p.s.i. for one minute. The resulting laminate was well-bonded, attractive and durable.

Other fibrous materials can be similarly laminated.

EXAMPLE 146

A polyhydroxyether film was laminated to kraft paper by pressing a film of the polyhydroxyether and the paper together in a press at 300° F. and 100 p.s.i. for one minute and cooling. Delamination was impossible.

EXAMPLE 147

Example 146 was duplicated using canvas in place of the paper. Again delamination was impossible.

EXAMPLE 148

A fire hose (cloth/rubber) laminate is bonded to a brass nozzle using polyhydroxyether as the adhesive.

EXAMPLE 149

A wound filament element was prepared. First fiber glass roving (12 end) finished with gamma amino propyl triethoxy silane was coated with polyhydroxyether by passing the fibers through a wire coating die maintained at a temperature of 450° C. About 15% by weight of the resulting coated fiber was polyhydroxyether. The coated fibers were run through rollers and flattened into a tape which were then wound on a mandrel, being heated in the process to 500° F. The resulting filament wound element is more ductile than epoxy resin bonded elements and, therefore, has greater impact strength. Solution coating can also be used.

EXAMPLE 150

A fishing rod of fiberglass is bonded with polyhydroxyethers. Other structures e.g. skis, ski poles, archery bows, javelins and vaulting poles can be similarly bonded.

EXAMPLE 151

Example 145 is duplicated but using fiberglass mat for the burlap, and aluminum for the plywood. The resulting laminate is well-bonded, attractive and durable.

The following example suggests the use of polyhydroxyether in patching clothing.

EXAMPLE 152

A cloth/polyhydroxyether laminate can be ironed on torn clothing using the polyhydroxyether as the adhesive and the heat of the iron to activate the resin. To point up the versatility of thermoplastic polyhydroxyethers it can be noted that these polymers can be used also to patch iron and other metal piping.

EXAMPLE 153

Example 146 was duplicated using muslin in place of the paper. Again delamination was impossible.

EXAMPLE 154

A rigid polyurethane foam was laminated to a 0.005 inch film of a thermoplastic polyhydroxyether prepared as in Example 1. Bonding was at 350° F. for 30 seconds. Adhesion developed indicating that rigid urethane foams can be formed and then surfaced with thermoplastic polyhydroxyether.

EXAMPLE 155

A polyurethane foam was prepared by foaming against a tube of 0.005 inch film of the thermoplastic polyhydroxyether of Example 115. Very good adhesion was obtained without heat, indicating urethane foams can be simultaneously formed and surfaced.

EXAMPLE 156

A plaque of Lucite (trademark of E. I. du Pont de Nemours for methyl methacrylate polymer) was laminated to a 0.005 inch film of the thermoplastic polyhydroxyether of Example 154 by holding the two together at nominal pressure for 5 minutes at 400° F. Very good adhesion was obtained.

EXAMPLE 157

Thermoplastic polyhydroxyether is used to secure metal to concrete by heating the metal e.g. an eye bolt to over 500° F. and inserting it in a close fitting aperture lined with polyhydroxyether film. The thermoplastic fuses forming a tenacious bond between the bolt and the concrete.

As with other thermoplastic materials polyhydroxyethers can contain numerous additives and modifiers, such as, among others, plasticizers, fillers, colorants, opacifiers, and extenders.

Among the plasticizers useful in the thermoplastic polyhydroxyethers are phthalates, phosphates, mono- and poly-basic acid esters, and epoxy resins. Particular plasticizers include dioctyl phthalate, triaryl phosphates, cresyl diphenyl phosphate, tricresyl phosphate, octyl diphenyl phosphate, trioctyl phosphate, tributyl phosphate, didecyl cresyl phosphate, dioctyl azelate, epoxidized soybean oil, butyl benzyl phthalate, stearyl stearate, 2,2-bis(4-hydroxyphenyl)propane, epoxidized novolac, epoxy polyether resins and epoxy resins of the diglycidyl ether of 2,2-bis(4-hydroxyphenyl)propane. Generally, from 5 to 30 parts of plasticizer per 100 parts by weight of thermoplastic polyhydroxyether are effective.

Among the extenders useful in thermoplastic polyhydroxyethers are metallic powders, clays and earth oxides. Particular extenders include aluminum powder (e.g. 400 U.S. mesh) aluminum oxide powder, mica, silica, talc, lithium aluminum silicate, colloidal alumina, asbestos, nylon, china clay, titanium dioxide, 2-mercapto benzothiozole, zinc dimethyl dithio carbamate, tetramethyl thiuram disulfide. Generally from 10 to 50% by weight of the thermoplastic polyhydroxyether composition can be comprised of the above extenders.

EXAMPLE 158

A polyhydroxyether is filled with conductive carbon black to make a semi-conductive element.

EXAMPLE 159

Example 158 is duplicated but using aluminum, copper, or iron particles.

EXAMPLE 160

Example 158 is duplicated but using magnetic iron oxide ($Fe_2O_3$) as the filler to make a chemically inert magnet.

EXAMPLE 161

Aluminum oxide 200 mesh is incorporated in polyhydroxyether to a concentration of 25%. The composition is extruded into 60 mil sheet. This structural element is useful as an abrasion resistant, non-skid surface such as is desirable in a boxcar side wall surfacing.

EXAMPLE 162

The sheet of aluminum oxide filled polyhydroxyether of Example 161 is narrowed at one edge and is useful as a cutting element.

EXAMPLE 163

Marble veneer 1″ thick is laminated to wood, by heating the adherends with polyhydroxyether in between until a glue line temperature of 500° F. is obtained. Excellent bonding is noted.

EXAMPLES 164–167

Example 163 is duplicated using granite (164), steel (165), cement (166), and cinder block (167) as substrates. Identical results are achieved.

EXAMPLE 168

A wood or steel heel and a leather sole for a woman's shoe is bonded to the shoe uppers with polyhydroxyether by pressing the adherends together and heating the polymer to 300° F. The laminate is inseparable.

EXAMPLE 169

A thermopane assembly was prepared by laying a ½″ square rod of polyhydroxyether around the periphery of a glass pane and superimposing a second glass pane and heating the assembly at the periphery until a glue line temperature of 400–500° F. was achieved. The laminate was inseparable.

EXAMPLE 170

Example 169 is duplicated, but coating one entire surface of one glass pane using a solution of the crosslinked polyhydroxyether of Example 116. Bonding was at 400° F. Adhesion is excellent.

EXAMPLE 171

An aquarium is fabricated of glass panes and a metal frame using polyhydroxyether as the bonding agent.

EXAMPLE 172

Example 171 is duplicated using polyhydroxyether as the corner posts and frame and setting the glass therein and bonding at 400° F.

EXAMPLE 173

Example 171 is duplicated using polyhydroxyether sheet in place of glass.

EXAMPLE 174

Using a film of polyhydroxyether a glass pane was bonded to a plywood sheet. An excellent bond was obtained.

EXAMPLE 175

Example 174 was duplicated, but using a brass sheet for one of the glass panes. An excellent bond was obtained.

EXAMPLE 176

Example 175 was duplicated, but using a ceramic tile for the brass sheet. An excellent bond was obtained.

EXAMPLE 177

Example 176 was duplicated, but using asbestos sheet for the ceramic tile. An excellent bond was obtained.

As indicated in Example 172 wholly polyhydroxyether structural pieces can be bonded to other materials to form useful articles. Other structural pieces can be mentioned. For example, junction boxes, switch plates and other electrical fixtures which are ordinarily mounted with screws and bolts can, if fabricated of polyhydroxyether be adhesively bonded to walls, especially of concrete or brick, baseboards especially of metal and other surfaces by use of heat alone, without screws or adhesives. Similarly use of mounting blocks of polyhydroxyether permits use of conventional, screw mounted, metal junction boxes but without need for drilling into the wall itself.

In all of the foregoing structural elements it is to be understood the polyhydroxyether can be embossed or otherwise surface treated for decorative effect.

In the preceding examples in the absence of a specific identification the polyhydroxyether referred to was prepared as in Example 1.

What is claimed is:

1. A structural element comprising an adherend selected from the class consisting of cellulosic, glass, ceramic, metal and synthetic organic polymeric adherends and adhering thereto a thermoplastic polyhydroxyether reaction product of substantially equimolar amounts of a dihydric phenol and epichlorohydrin, said thermoplastic polyhydroxyether having a degree of polymerization of at least 30.

2. The structural element claimed in claim 1, wherein the dihydric phenol is 2,2-bis(4-hydroxyphenyl)-propane and the thermoplastic polyhydroxyether has a degree of polymerization of above about 80.

3. The structural element claimed in claim 1, wherein the cellulosic adherend is wood.

4. The structural element claimed in claim 1, wherein the metal adherend is steel.

5. The structural element claimed in claim 1, wherein the metal adherend is aluminum.

6. The structural element claimed in claim 1, wherein the synthetic polymeric adherend is an ethylene polymer.

7. The structural element claimed in claim 6, wherein the ethylene polymer is polyethylene.

8. Method for making structural elements comprising an adherend selected from the class consisting of cellulosic, glass, ceramic, metal, and synthetic organic polymeric adherends and adhering thereto a thermoplastic polyhydroxyether reaction product of substantially equimolar amounts of a dihydric phenol and epichlorohydrin, said thermoplastic polyhydroxyether having a degree of polymerization of at least 30, including the step of contacting a surface of the adherend with the thermoplastic polyhydroxyether under conditions conducive to flow of the polyhydroxyether over said adherend surface.

9. Method claimed in claim 8, wherein the conditions are conditions of heat and pressure sufficient to flux the polyhydroxyether.

10. Method claimed in claim 9, wherein the thermoplastic polyhydroxyether is heated to above 500° F.

References Cited by the Examiner

UNITED STATES PATENTS

| | | | |
|---|---|---|---|
| 2,582,985 | 1/1952 | Greenlee | 260—47 |
| 2,592,560 | 4/1952 | Greenlee | 260—47 |
| 2,602,075 | 7/1952 | Carpenter | 260—47 |
| 2,615,007 | 10/1952 | Greenlee | 260—47 |
| 2,694,694 | 11/1954 | Greenlee | 260—47 |
| 2,767,157 | 10/1956 | Masters | 260—47 |
| 2,824,855 | 2/1958 | Freeman et al. | 260—47 |
| 2,943,096 | 6/1960 | Reinking | 260—47 |
| 2,970,077 | 1/1961 | Groves | 156—330 XR |
| 3,026,229 | 3/1962 | Wilcox | 156—309 |
| 3,177,089 | 4/1965 | Marshall et al. | 117—72 |
| 3,177,090 | 4/1965 | Bayes et al. | 117—75 XR |

FOREIGN PATENTS 516,921   9/1955   Canada.

OTHER REFERENCES

Glazer, Jr.: Monolayer Studies of Some Ethoxylin Resin Adhesives and Related Compounds, Journal of Polymer Science, 8, (70), pp. 355–369, April 1954.

Hurd, J.: Adhesives Guide, Great Britain, British Scientific Instrument Research Ass'n, 1959, p. 78.

Lee, J.: Epoxy Resins, N.Y., McGraw-Hill, July 1957, pp. 213–227.

EARL M. BERGERT, *Primary Examiner.*

ALEXANDER WYMAN, JOSEPH REBOLD,
*Examiners.*

W. B. WALKER, HAROLD ANSHER,
*Assistant Examiners.*